(12) United States Patent
Ando et al.

(10) Patent No.: US 8,683,162 B2
(45) Date of Patent: Mar. 25, 2014

(54) COMPUTER SYSTEM AND METHOD OF MANAGING STORAGE SYSTEM MONITORING ACCESS PERFORMANCE FOR RISKY POOL DETECTION

(75) Inventors: Nobuhiko Ando, Tokyo (JP); Hiroshi Nojima, Tokyo (JP)

(73) Assignee: Hitachi, Ltd., Tokyo (JP)

(*) Notice: Subject to any disclaimer, the term of this patent is extended or adjusted under 35 U.S.C. 154(b) by 233 days.

(21) Appl. No.: 13/384,910

(22) PCT Filed: Jun. 8, 2011

(86) PCT No.: PCT/JP2011/063165
§ 371 (c)(1),
(2), (4) Date: Jan. 19, 2012

(87) PCT Pub. No.: WO2012/169027
PCT Pub. Date: Dec. 13, 2012

(65) Prior Publication Data
US 2012/0317358 A1 Dec. 13, 2012

(51) Int. Cl.
*G06F 12/00* (2006.01)
(52) U.S. Cl.
USPC .......................................... 711/165; 711/170
(58) Field of Classification Search
USPC ................................................. 711/165, 170
See application file for complete search history.

(56) References Cited

U.S. PATENT DOCUMENTS

2007/0234109 A1  10/2007  Soran et al.
2009/0249018 A1  10/2009  Nojima et al.
2012/0005435 A1*  1/2012  Emaru et al. ................... 711/154
2012/0079226 A1*  3/2012  Kihara et al. .................. 711/165
2012/0185644 A1*  7/2012  Kaneko et al. ................. 711/114

FOREIGN PATENT DOCUMENTS

JP   2009-238114 A   10/2009
JP   2009-252106 A   10/2009
WO  WO2011/092738 A1   8/2011

OTHER PUBLICATIONS

International Search Report mailed Sep. 6, 2011 in Int'l App. PCT/JP2011/063165 (2 pgs.).
Written Opinion mailed Sep. 6, 2011 in Int'l App. PCT/JP2011/063165 with attached English translation of Box No. V (4 pgs.).

* cited by examiner

*Primary Examiner* — John Lane
(74) *Attorney, Agent, or Firm* — Foley & Lardner LLP

(57) ABSTRACT

In an embodiment, a storage system includes pools each of which includes storage resources and is separated into tiers different in access performance. A management system monitors access performance of the pools to detect a risky pool expected to become unable to satisfy predetermined access performance requirements. The management system estimates access performance of each of one or more candidate pools in the pools in the case where a storage resource migrates from the candidate pool to the risky pool, by simulation based on variations in data arrangement in the pool caused by evacuating data held in the storage resource in the same pool for the migration of the storage resource. The management system determines that a storage resource migrates from a source pool of which the estimated access performance satisfies predetermined performance requirements to the risky pool.

15 Claims, 28 Drawing Sheets

| VIRTUAL VOLUME INFORMATION TABLE ||||
| --- | --- | --- | --- |
| VIRTUAL VOLUME ID | POOL ID | UPPER LIMIT OF REQUESTED RESPONSE TIME (ms) | LATEST RESPONSE TIME (ms) |
| 1 | 1 | 15 | 13 |
| 2 | 2 | 20 | 12 |
| 3 | 3 | 20 | 10 |
| 4 | 3 | 15 | 9 |
| : | : | : | : |
| : | : | : | : |

POOL INFORMATION TABLE 511

| POOL ID | START TIME OF MONITORING PERIOD | END TIME OF MONITORING PERIOD | MONITORING PERIOD CYCLE (h) | EXECUTION MODE | REAL TIME IOPS | DAILY AVERAGE PERFORMANCE MARGIN PERCENTAGE (%) |
|---|---|---|---|---|---|---|
| 1 | - | - | 24 | AUTOMATIC | 150000 | 20 |
| 2 | 0:00 | 6:00 | - | AUTOMATIC | 90000 | 40 |
| 3 | - | - | 8 | AUTOMATIC | 70000 | 30 |
| 4 | - | - | 4 | AUTOMATIC | 10000 | 40 |
| 5 | - | - | - | MANUAL | 60000 | 50 |
| .. | .. | .. | .. | | .. | .. |

POOL VOLUME INFORMATION TABLE 512

| POOL VOLUME ID | TIER | POOL VOLUME CAPACITY (MB) | POOL VOLUME UNUSED CAPACITY (MB) | POOL ID |
|---|---|---|---|---|
| 1 | TIER0 | 50GB | 0GB | 1 |
| 2 | TIER1 | 50GB | 0GB | 1 |
| 3 | TIER0 | 50GB | 0GB | 2 |
| 4 | TIER2 | 50GB | 20GB | 3 |
| .. | .. | .. | .. | .. |

| IN-POOL TIER INFORMATION TABLE ||||
|---|---|---|---|
| POOL ID | TIER | NUMBER OF CONSTITUENT RESOURCES | TIER CAPACITY (GB) |
| 1 | TIER0 | 10 | 500 |
| 1 | TIER1 | 20 | 1000 |
| 1 | TIER2 | 30 | 1500 |
| 2 | TIER0 | 7 | 700 |
| : | : | : | : |
| : | : | : | : |

PAGE INFORMATION TABLE 514

| POOL ID | PAGE ID | VIRTUAL VOLUME ID | POOL VOLUME ID | TIER | I/O COUNT IN PREVIOUS MONITORING PERIOD |
|---|---|---|---|---|---|
| 1 | 1 | 1 | 1 | TIER0 | 18000 |
| 1 | 2 | 1 | 1 | TIER0 | 22000 |
| 1 | 3 | 1 | 2 | TIER1 | 12000 |
| 1 | 4 | 1 | 3 | TIER2 | 6000 |
| .. | .. | .. | .. | .. | .. |
| 1101 | 1102 | 1103 | 1104 | 1105 | 1106 |

| TIMESLOT-AVERAGED IOPS INFORMATION TABLE | | | |
|---|---|---|---|
| POOL ID | TIMESLOT | TIMESLOT-AVERAGED IOPS | NUMBER OF UPDATES |
| 1 | 0:00-0:10 | 5000 | 20 |
| 1 | 0:10-0:20 | 5500 | 20 |
| 1 | 0:20-0:30 | 7000 | 20 |
| : | : | : | : |
| 1 | 12:00-12:10 | 500000 | 20 |
| : | : | : | : |
| 1201 | 1202 | 1203 | 1204 |

| I/O HISTORY INFORMATION TABLE | | |
|---|---|---|
| POOL ID | DATE & TIME | IOPS |
| 1 | 2011/03/11 / 0:00-0:10 | 4000 |
| 1 | 2011/03/11 / 0:10-0:20 | 5000 |
| 1 | 2011/03/11 / 0:20-0:30 | 6500 |
| : | : | : |
| 1 | 2011/03/11 / 12:00-12:10 | 505000 |
| : | : | : |

IN-POOL TIER PERFORMANCE INFORMATION TABLE — 523

| POOL ID | TIER | DATE & TIME | RESPONSE TIME (ms) |
|---|---|---|---|
| 1 | TIER0 | 2011/03/11 / 0:00-0:10 | 3.0 |
| 1 | TIER0 | 2011/03/11 / 0:10-0:20 | 3.1 |
| : | : | : | : |
| 1 | TIER1 | 2011/03/11 / 0:00-0:10 | 11.0 |
| : | : | : | : |
| 1 | TIER2 | 2011/03/11 / 0:00-0:10 | 15.0 |
| : | : | : | : |

1501　1502　1503　1504

521

| IOPS VS. RESPONSE TIME CORRELATION INFORMATION TABLE | | | |
|---|---|---|---|
| TIER | IOPS RANGE | IOPS RANGE-AVERAGED RESPONSE TIME (ms) | CUMULATIVE I/O COUNT |
| TIER0 | 0-500 | 1ms | 6000 |
| TIER0 | 500-1000 | 1.1ms | 12000 |
| TIER0 | 1000-1500 | 1.3ms | 30000 |
| TIER0 | 1500-2000 | 1.5ms | 29000 |
| : | : | : | : |
| : | : | : | : |

| RISKY POOL TABLE | |
|---|---|
| RISKY POOL ID | PERFORMANCE MARGIN PERCENTAGE OF VIRTUAL VOLUME |
| 1 | 5% |
| 2 | 10% |
| : | : |
| : | : |

| TIER DEFINITION TABLE | | | | 517 |
|---|---|---|---|---|
| TIER | KIND OF DRIVE | COST | TRANSFER CAPABILITY | |
| TIER0 | SSD | 20 | 500MB/SEC | |
| TIER1 | SAS | 10 | 200MB/SEC | |
| TIER2 | SATA | 5 | 150MB/SEC | |
| 2201 | 2202 | 2203 | 2204 | |

FIG.22

PROPOSED RESOURCE MIGRATION PLAN TABLE 515

| SOURCE POOL ID | IMMEDIATE INTER-TIER REARRANGEMENT | START TIME OF RESOURCE MIGRATION | EXPECTED END TIME OF RESOURCE DEALLOCATION | DAILY AVERAGE PERFORMANCE MARGIN PERCENTAGE | DAILY AVERAGE PERFORMANCE MARGIN PERCENTAGE AFTER RESOURCE DEALLOCATION |
|---|---|---|---|---|---|
| 2 | YES | 10:00 | 11:00 | 40 | 20 |
| 3 | NO | 10:00 | 11:00 | 30 | 20 |
| 4 | YES | 10:00 | 11:00 | 40 | 15 |
| .. | .. | .. | .. | .. | .. |
| 2401 | 2402 | 2403 | 2404 | 2405 | 2406 |

RESOURCE MIGRATION PLAN TABLE (516)

| SOURCE POOL ID | DESTINATION POOL ID | MIGRATION RESOURCE ID | IMMEDIATE INTER-TIER REARRANGEMENT | START TIME OF MIGRATION |
|---|---|---|---|---|
| 3 | 1 | 4 | NO | 10:00 |
| .. | .. | .. | .. | .. |
| 2701 | 2702 | 2703 | 2704 | 2705 |

COMPUTER SYSTEM AND METHOD OF MANAGING STORAGE SYSTEM MONITORING ACCESS PERFORMANCE FOR RISKY POOL DETECTION

BACKGROUND

This invention relates to a computer system and a method of managing a storage system and, in particular, to reallocation of resources in the storage system.

In a known implementation of a storage system that provides hosts with volumes, the storage system configures tiered pools each composed of a plurality of media different in performance capability and allocates virtual volumes formed from the pools to the hosts (for example, refer to Patent Literature 1).

The storage system analyzes I/O (Input/Output) load from the host to the virtual volume, and automatically allocates pages with high I/O load to a tiers of high levels, which are composed of resources configured with high-performance high-cost disks, and the other pages to tiers of lower levels, which are composed of resources configured with lower-performance lower-cost disks. This configuration efficiently achieves satisfaction of performance requirements at lower TCO (Total Cost of Ownership).

Patent Literature 1 US 2007/234109 A

SUMMARY

Under the circumstance where the same storage system provides a plurality of hosts with volumes, separate pools may be provided to eliminate conflict of I/Os of the hosts. A traditional technique determines distribution of tiers pool by pool for operation; consequently, if I/O load is disproportioned among pools, the risks that the pools might become unable to satisfy performance requirements from the hosts vary among the pools.

If there exists a pool (risky pool) that is more likely to become unable to satisfy the performance requirements from the host, it is necessary to upgrade the performance of the pool at an earliest occasion. For this reason, the administrator must carefully monitor the performance of each pool, which increases the management cost. In the known technique, it is necessary to add unused resources to the risky pool to upgrade the performance of the risky pool, which causes the necessity for the resources to stand by in the storage system, resulting in increase in the system cost.

Desired for a storage system is that all pool are ensured to satisfy performance requirements from hosts while keeping the management cost as low as possible. In addition to this, it is important to reduce the amount of unused resources in the storage system to save the system cost.

An aspect of this invention is a computer system comprising a storage system and a management system coupled to the storage system via a network and configured to manage the storage system. The storage system includes a plurality of pools each of which includes a plurality of storage resources and is separated into a plurality of tiers different in access performance. The management system monitors access performance of the plurality of pools to detect a risky pool which is expected to become unable to satisfy predetermined access performance requirements. The management system estimates access performance of each of one or more candidate pools in the plurality of pools in a case where a storage resource thereof migrates to the risky pool, by simulation based on variations in data arrangement in the pool caused by evacuating data held in the storage resource in the same pool for the migration of the storage resource. The management system determines that the storage resource migrates from a source pool of which the estimated access performance satisfies predetermined performance requirements to the risky pool.

An aspect of this invention can efficiently satisfy performance requirements to the pools in a storage system.

BRIEF DESCRIPTION OF THE DRAWINGS

FIG. 7 exemplifies a virtual volume information table in this embodiment;

FIG. 8 exemplifies a pool information table in this embodiment;

FIG. 9 exemplifies a pool volume information table in this embodiment;

FIG. 10 exemplifies an in-pool tier information table in this embodiment;

FIG. 11 exemplifies a page information table in this embodiment;

FIG. 12 exemplifies a timeslot-averaged IOPS information table in this embodiment;

FIG. 13 exemplifies an I/O history information table in this embodiment;

FIG. 15 exemplifies an in-pool tier performance information table in this embodiment;

FIG. 16 exemplifies the IOPS vs. response time correlation information table in this embodiment;

FIG. 19 exemplifies a risky pool table in this embodiment;

FIG. 22 exemplifies a tier definition table in this embodiment;

FIG. 24 exemplifies a proposed resource migration plan table in this embodiment;

FIG. 27 exemplifies a resource migration plan table in this embodiment;

DETAILED DESCRIPTION OF THE PREFERRED EMBODIMENTS

Hereinafter, an embodiment of this invention will be described. For clarity of explanation, the following descriptions and the accompanying drawings contain omissions and simplifications as appropriate. Throughout the drawings, like components are denoted by like reference signs and their repetitive explanation is omitted for clarity of explanation, if not necessary.

Figure 1:
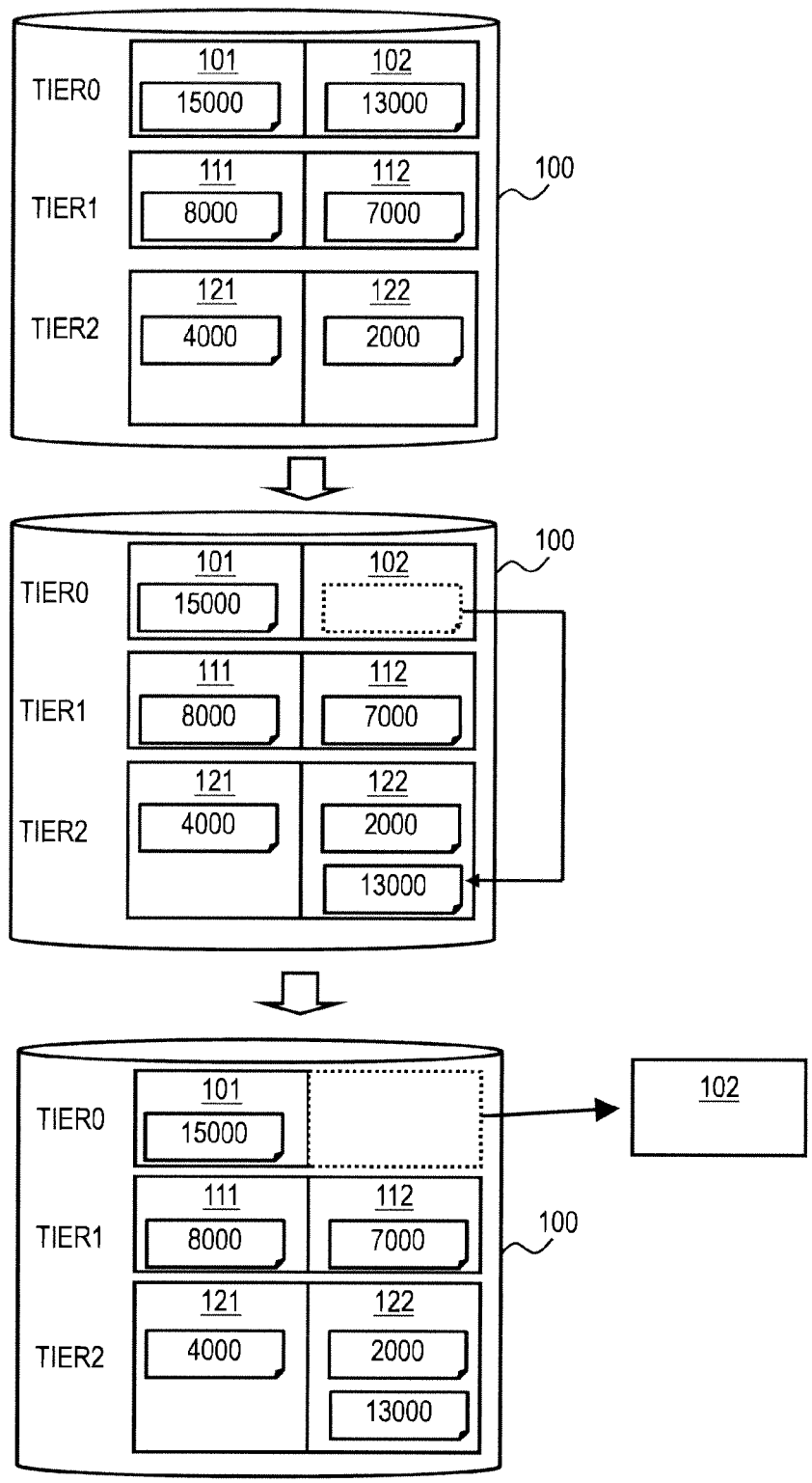
FIG. 1 is a drawing for illustrating an outline of a preferred embodiment of this invention.
Figure 2:
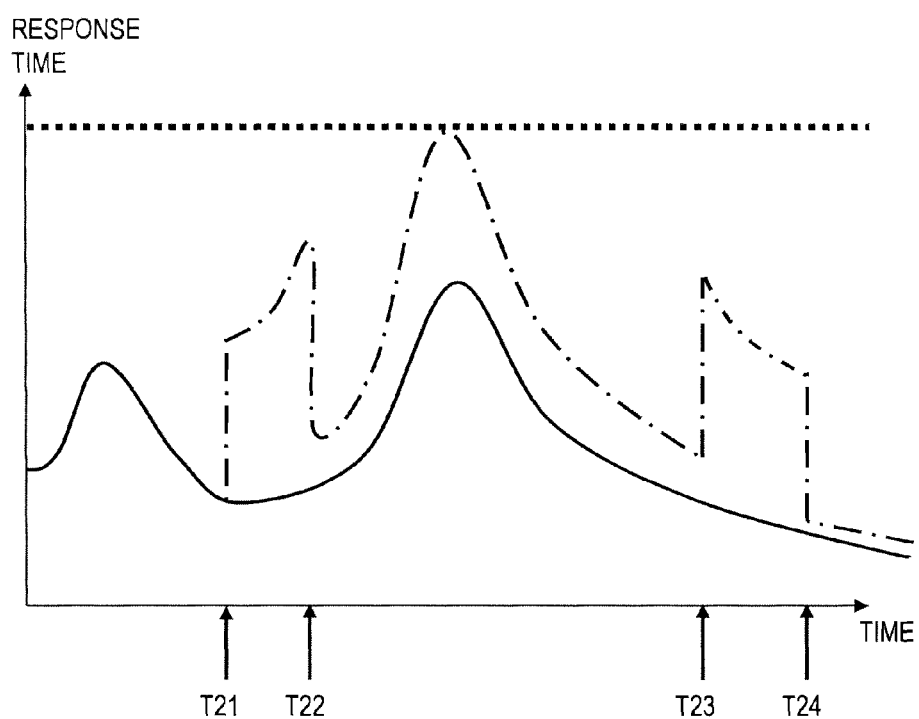
FIG. 2 is a drawing for illustrating an outline of the embodiment.

This embodiment relates to reallocation of resources (storage resources) among pools. With reference to FIG. 1 and FIG. 2, the outline of this embodiment will be described. A storage system of this embodiment configures a pool 100 composed of a plurality of pool volumes (real volumes). The pool 100 is hierarchically structured to have a plurality of tiers depending on access performance; it has three tiers in this example. Volumes in Tier 0 show the highest access performance and volumes in Tier 2 show the lowest.

Each tier is composed of a plurality of real volumes; in this example, Tier 0 is composed of pool volumes 101 and 102, Tier 1 is composed of pool volumes 111 and 112, and Tier 2 is composed of pool volumes 121 and 122. Each pool volume is separated into a plurality of pages and each page stores data. In FIG. 1, a numeric figure in each page indicates I/O (Input/Output) count in the page in a given time period.

In an environment where a plurality of pools configured in a storage system provide a plurality of host servers with volumes, it might happen that some pool cannot show the performance that satisfies performance requirements (SLOs: Service Level Objectives) from host servers. Upon detection of a sign of such a situation, the system of this embodiment performs migration of a storage resource (a real volume) which is a constituent of a different pool (hereinafter, source pool) having surplus performance capability to the pool (hereinafter, risky pool) which is more likely to become unable to satisfy the SLOs to upgrade the performance of the risky pool.

The system of this embodiment monitors access performance of each pool. A typical index of the access performance to be monitored is response time. Upon determination that the access performance of any one of the pools might be unable to meet the performance requirements to the pool, the system automatically deallocates a pool volume of a storage resource in a different pool and adds the pool volume to the risky pool.

This operation upgrades the performance of the pool in which the access performance is lowered. Moreover, it reduces the administrator's load to save management costs, and further, reduces the required amount of standing-by resources in the storage system to save system costs.

The example of FIG. 1 evacuates a page (storage data) in the pool volume 102 to the pool volume 122 in the same pool 100 and deallocates the pool volume 102 from the pool 100. The pool volume 102 is added to a different risky pool in need of it. In the tier where the pool volume 102 is added, pages are rearranged (rebalanced) so that the I/O count will be uniform among the pages.

In FIG. 1, a high-loaded page, or a page with high I/O count in a given period, is evacuated to the lower-speed Tier 2. The system of this embodiment deallocates the pool volume 102, and then rearranges the pages (data) in the source pool 100 between tiers. This operation allows pages with high I/O count to be stored in a high-performance tier, achieving upgraded access performance of the pool. The system performs predetermined periodic inter-tier rearrangements and/or inter-tier rearrangement at a time different from that of the predetermined periodic inter-tier rearrangement.

During execution of this inter-tier rearrangement, the access performance of the pool degrades. As described above, virtual volumes in a pool have been provided with performance requirements from host servers. Each virtual volume (each pool) is required to satisfy the performance requirement all the time. Although the performance upgrades in the pool to which a volume is added, the performance degrades in the pool from which a pool volume is deallocated. Accordingly, it is required for a pool volume to migrate from a pool that can satisfy the performance requirements even after the volume is deallocated.

Moreover, the tier-to-tier page migration within a pool degrades the access performance of the pool (virtual volume). This is because the load caused by the page migration degrades the capability of the storage system in processing accesses to the virtual volume. The degradation in access performance occurs at page evacuation within a pool for migration of a pool volume (refer to FIG. 1) and at inter-tier rearrangement of pages to upgrade the access performance of every page.

FIG. 2 schematically illustrates an example of the time variation of the response time of a source pool to provide a pool volume. In FIG. 2, the Y-axis represents the response time and the X-axis represents time. The solid line denotes the response time before a volume migration, the dashed-dotted line denotes the estimated response time after the volume migration, and the dotted line denotes the response time required by SLOs.

At time T21, a page migration (data evacuation) in a pool starts to deallocate a pool volume from the source pool. As indicated by the line of the estimated response time, the response time drastically increases because of the load by the page migration. Since the page migrates to a tier with lower performance capability (refer to FIG. 1), the response time gradually increases from the start of the migration T21. At time T22, the migration for page evacuation ends. Since the load by the page migration is eliminated, the response time drastically decreases.

Since the page stored in a tier with high performance capability has migrated to a tier with low performance capability, the response time after the page evacuation is longer than the response time before the resource migration (indicated by the solid line). At time T23, a periodic inter-tier rearrangement starts and ends at the time T24. Through this operation, the page arrangement in the pool is optimized. The inter-tier rearrangement rearranges the pages to the tiers based on the I/O count of each page in the pool recorded during a monitoring period in such a descending order of the I/O count that the page with the highest I/O count will be first relocated to the tier of the highest level. The inter-tier rearrangement is carried out pool by pool.

Because of the load by the page migration in the inter-tier rearrangement, the response time is significantly long between the time T23 and the time T24. Since a page with relatively high I/O count migrates to a tier with high performance capability in the inter-tier rearrangement, the response time gradually decreases from the time T23 to the time T24. When the inter-tier rearrangement ends at the time T24, the response time drastically decreases.

If a greater likelihood of an SLO violation is detected in a risky pool, it is necessary to upgrade the performance by adding a resource to the pool at an earliest occasion. For a resource (pool volume) migration from a source pool, the resource needs to be deallocated from the source pool; the data held in the resource to be deallocated must be evacuated to another resource (pool volume) in the pool as explained with reference to FIG. 1 and FIG. 2.

This operation ruins the optimum page arrangement in the source pool and the performance of the pool is kept low until an inter-tier rearrangement provides another optimum page arrangement. The inter-tier rearrangement for optimizing the page arrangement can be carried out at any time, but in most cases, it is scheduled to be performed periodically in a specific timeslot. For this reason, it is required to ensure that the performance of the source pool does not violate the SLOs from the start of data evacuation within the pool (the start of deallocation of a resource) to the completion of inter-tier rearrangement.

As described above, during a pool volume migration between pools and a page migration within the pool for a periodic page inter-tier rearrangement, the pool shows significantly degraded access performance and takes severely increased response time. Accordingly, the pool is required to satisfy access performance requirements by SLOs during the page migration in the pool.

The system of this embodiment makes a plan of pool-to-pool resource migration. The resource migration deallocates a resource in a source pool and adds it to a risky pool. In the planning, the system estimates access performance of each of the risky pool and candidates for the source pool after a resource migration and the subsequent page inter-tier rearrangement are carried out. It determines the source pool to provide a resource and the kind and the capacity of the resource to migrate based on the result of the estimation.

In a preferable configuration, the system of this embodiment, in selecting the source pool to provide a resource, estimates the performance degradation in the source pool caused by providing a resource thereof by simulation based on history data. It predicts whether the performance of (the virtual volume in) the source pool can satisfy the SLOs to determine candidate pools for the source pool.

Performance estimation foresees performance degradation caused by page migration in the pool for deallocation of a resource and performance degradation caused by tier-to-tier page migration in the pool in inter-tier rearrangement. In a preferable configuration, the system of this embodiment estimates the pool performance in both of the cases where the system performs an inter-tier rearrangement in the source pool immediately after a resource migration from the source pool and does not perform it immediately.

The estimation of performance degradation depends on the start time of the resource migration (data evacuation). The system of this embodiment estimates performance of the pools subjected to estimation while changing the start time of the resource migration.

The soonest upgrade of performance is important for a risky pool. For this reason, in a preferable configuration, the system selects a pool that can provide its resource (that can complete data evacuation in the pool) at the earliest time and perform resource migration from the pool to the risky pool. This operation upgrades the performance of the risky pool at the earliest occasion while lowering the likelihood that the overall storage system will become unable to satisfy the SLOs.

Figure 3:
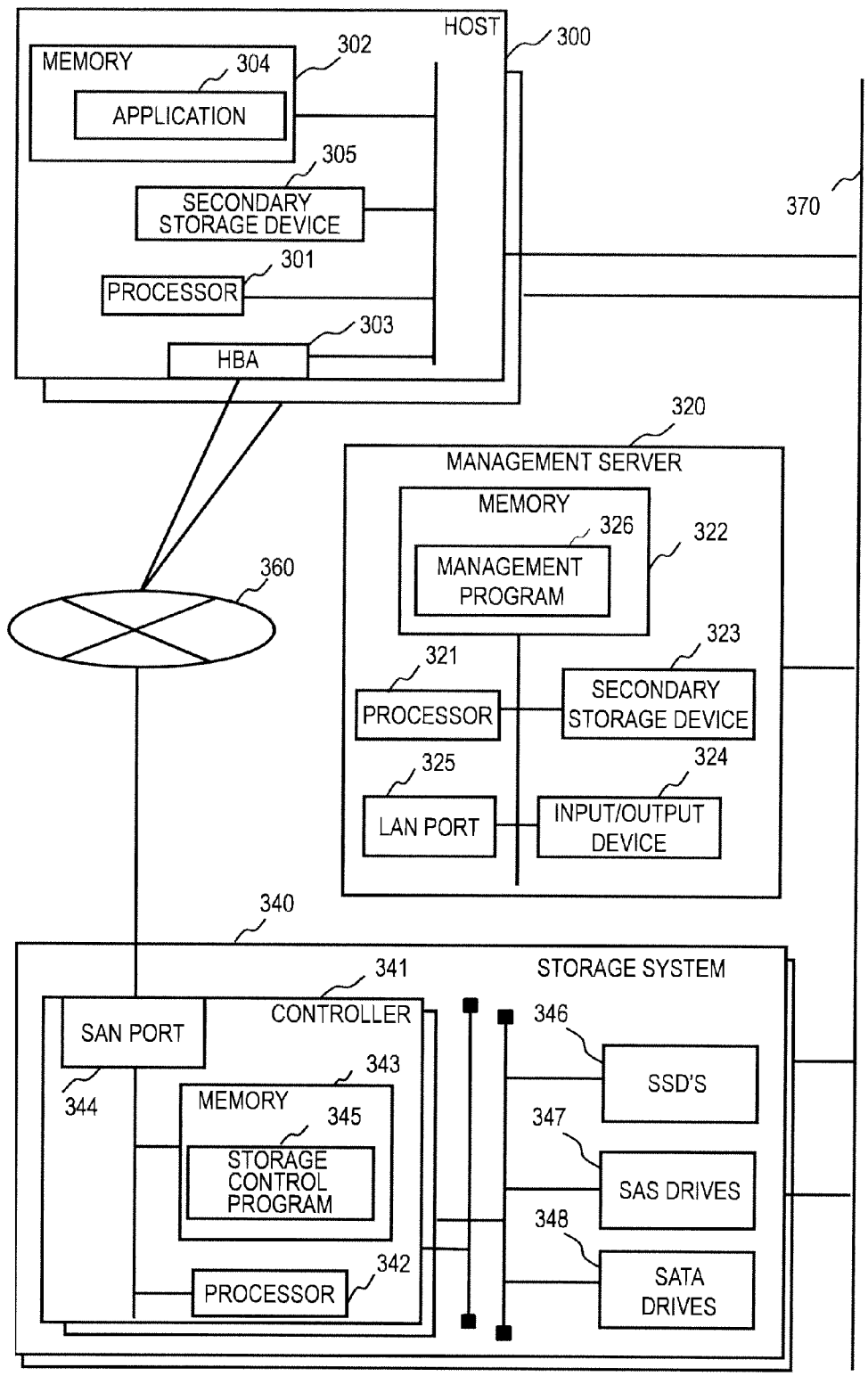
FIG. 3 schematically illustrates a system configuration in the embodiment.

Hereinafter, a computer system of this embodiment and operations thereof will be described with reference to the drawings. FIG. 3 is a block diagram schematically illustrating a general configuration of the computer system of this embodiment. The computer system comprises a plurality of host servers 300, a management server 320, and a plurality of storage systems 340. Each host server 300 has the same configuration and each storage system 340 has the same configuration. The number of host servers 300, management servers 320, and the storage systems 340 may be any number of one or more.

The host servers 300, the management server 320, and the storage systems 340 are connected so as to be able to communicate with one another via a management network 370. In this configuration, it is an IP network. The management network 370 may be a network other than the IP network as far as it is a network for data communication.

The host servers 300 and the storage systems 340 are connected via a data network 360. The data network 360 is a network for data communication, which is a SAN (Storage Area Network) in this configuration. The data network 360 may be a network other than the SAN as far as it is a network for data communication.

A host server 300 is a computer that accesses resources of the storage systems 340 to perform jobs. The host server 300 includes an HBA (Host Bus Adapter) 303 of a network interface, a processor 301, a memory 302 of a primary storage device, and a secondary storage device 305.

The devices in the host server 300 are connected to be able to communicate with one another via a bus. The processor 301 executes programs held in the memory 302 to implement predetermined functions of the host server 300. The memory 302 stores programs to be executed by the processor 301 and data necessary to execute the programs. The programs include a not-shown OS (Operating System) and an application 304.

In typical, a program is loaded from the secondary storage device 305 to the memory 302. The secondary storage device 305 is a storage device including a non-volatile non-transitory storage medium for storing programs and data necessary for implementing predetermined functions of the host server 300. The secondary storage device 305 may be an external storage device connected via a network.

FIG. 3 exemplifies an application 304 but a plurality of applications may run on the host server 300. The application 304 may be groupware/email server program or a database management system. A storage system 340 provides the application 304 with one or more volumes.

The management server 320 includes a LAN port 325 of a network interface, a processor 321, a memory 322 of a primary storage device, a secondary storage device 323, and an input and output device 324. The management server 320 executes a management program 326 and operates in accordance with the program. The devices in the management server 320 are connected so as to be able to communicate with one another via a bus.

The input/output device 324 includes one or more devices such as a display monitor, a pointer, and a keyboard. An administrator can operate the management server 320 with these input/output devices 324. In addition, the administrator may access the management server 320 from a client computer connected to the management server via a network. The client computer is included in a management system together with the management server 320.

The administrator inputs necessary information with an input device (such as a mouse or a keyboard) and checks the necessary information by sight with a display device. The management system may be configured with a single management server 320 and can include a plurality of servers each of which has a part or all of the functions of the management server 320.

The processor 321 executes programs held in the memory 322 to implement predetermined functions of the management server 320. The memory 322 stores programs to be executed by the processor 321 and data necessary to execute the programs. The programs include not shown OS and a management program 326. The details of the management program 326 will be described later.

In typical, a program is loaded from the secondary storage device 323 to the memory 322. The secondary storage device 323 is a storage device including a non-volatile non-transitory storage medium for storing programs and data necessary to implement predetermined functions of the management server 320. The secondary storage device 323 may be an external storage device connected via a network.

A storage system 340 includes a controller 341, SSDs (Solid State Drives) 346, SAS (Serial Attached SCSI) drives 347, SATA (Serial ATA) drives 348. These are connected via an internal network.

The controller 341 includes a processor 342, a memory 343 of a primary storage device, and a SAN port 344 of a data communication interface. The processor 342 (the controller 341) executes a storage control program 345 and other necessary programs to implement predetermined functions including control of I/Os from host servers 300 and management control of pools and volumes in the storage system 340. In typical, a program is loaded from any one of the disks to the memory 343. A part or all of the functions of the controller 341 explained in this embodiment may be implemented by hardware.

In this computer system, a program is executed by a processor to perform predetermined processing using storage devices and communication interfaces. Accordingly, the explanations in this embodiment having the subjects of "program" such as the management program 326 or the storage control program 345 may be replaced with those having the subjects of "processor". The processing executed by a program is processing performed by the apparatus or the system on which the program is running.

A processor operates in accordance with a program to function as an operation part for implementing a predetermined function. For example, the processor 321 operates in accordance with the management program 326 to function as a storage system manager and the processor 342 operates in accordance with the storage control program 345 to function as a storage controller. The same applies the other programs, the processors, and the apparatuses. A processor functions as operation parts that implement a plurality of processes executed by each program. Apparatuses and systems including a processor and a program are the apparatuses and systems including these operation parts.

Figure 4:
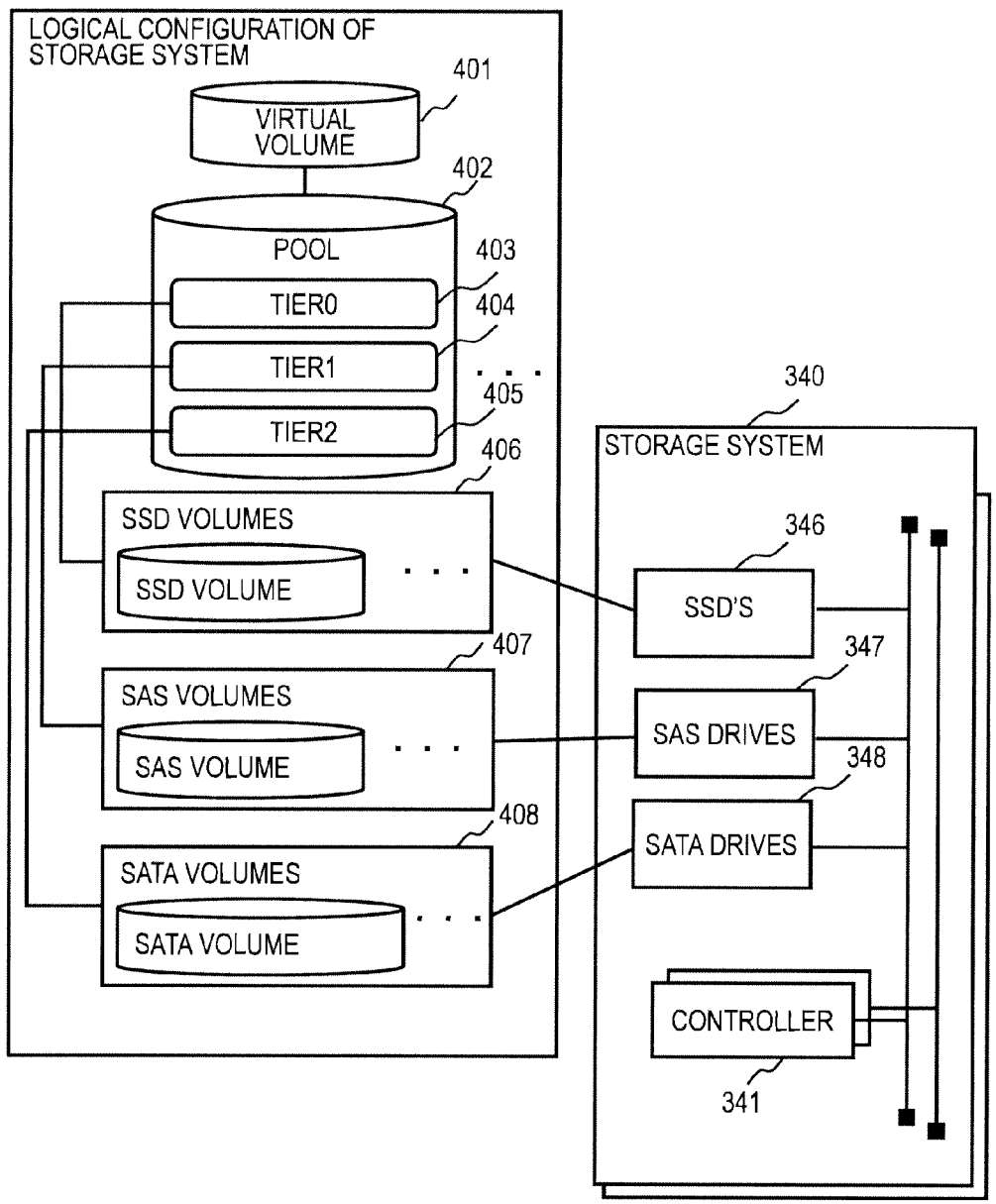
FIG. 4 schematically illustrates a logical configuration in a storage system in the embodiment.

FIG. 4 schematically illustrates a logical configuration of volumes a storage system 340 provides to a host server 300 and the relationships between the volumes and the drives 346 to 348. The controller 341 (the storage control program 345) in a storage system 340 constructs a pool 402 composed of a plurality of real volumes (pool volumes). As shown in FIG. 4, the controller 341 constructs a plurality of pools 402. Moreover, the controller 341 constructs a virtual volume 401 to which storage areas in a pool are dynamically allocated. A host server 300 is provided with the virtual volume 401.

The controller 341 constructs a plurality of real volumes composed of real storage areas provided by the drives 346 to 348. In this configuration example, the controller 341 constructs three kinds of volumes depending on the kind of the drives. Specifically, the SSDs 346 provide SSD volumes 406, the SAS drives 347 provide SAS volumes 407, and the SATA drives 348 provide SATA volumes 408.

The foregoing three kinds of drives are different in access performance; the SSDs show the highest performance and the SATA drives show the lowest. The access performance is indicated by an index such as response time or throughput. In this configuration example, it is assumed that the same kind of drives show the same access performance. Typically, RAID (Redundant Arrays of Inexpensive Disks) composed of a plurality of drives provide a plurality of volumes (resources).

The plurality of volumes (pool volumes) in a pool 402 are classified into tiers. In this configuration example, the pool 402 has three tiers of Tier 0 (403), Tier 1 (404), and Tier 2 (405). The tiers are composed of different kinds of volumes from one another. The Tier 0 is composed of SSD volumes 406; the Tier 1 is composed of SAS volumes 407; and the Tier 2 is composed of SATA volumes 408. The Tier 0 shows the highest access performance and the Tier 2 shows the lowest.

In the pool 402, each pool volume is separated into a plurality of pages. The pool 402 is managed in units of page. A volume to be provided to a host server 300 is a virtual volume and its capacity is virtualized. Every time a write from a host server 300 to a virtual volume 401 creates a need of data storage area, the storage control program 345 allocates a page to the virtual volume 401.

A storage system 340 can make the capacity of a virtual volume 401 recognized by a host server 300 larger than the real capacity allocated to the virtual volume 401 (the total capacity of all pages) and also can make the real capacity to provide the capacity allocated to the host server 300 smaller than the allocated capacity (dynamic provisioning). The storage system 340 may provide the host server 300 with a volume which is composed of pages in a pool and whose real capacity is equal to the capacity recognized by the host server 300.

In this preferable configuration example, upon occurrence of a write from a host server 300 to a virtual volume 401, the storage control program 345 allocates the virtual volume 401 new pages with a required capacity from pages in the Tier 0 (403) of the highest level in the pool 402. The storage control program 345 may use a different method to determine the page to be written to.

The storage control program 345 monitors and stores the I/O count (in this example, the total number of read commands and write commands) to all of the pages in each tiered pool 402 in the storage system 340 for a given period (monitoring period). The storage control program 345 rearranges the pages to the tiers (inter-tier rearrangement) in such a descending order of the I/O count that the page with the highest I/O count will be first relocated to the tier of the highest level, based on the I/O count of each page in the pool 402 during the monitoring period. The storage control program 345 performs the inter-tier rearrangement in units of pool. The inter-tier rearrangement is a known technique; explanations thereon will be provided as necessary in this embodiment.

Figure 5:
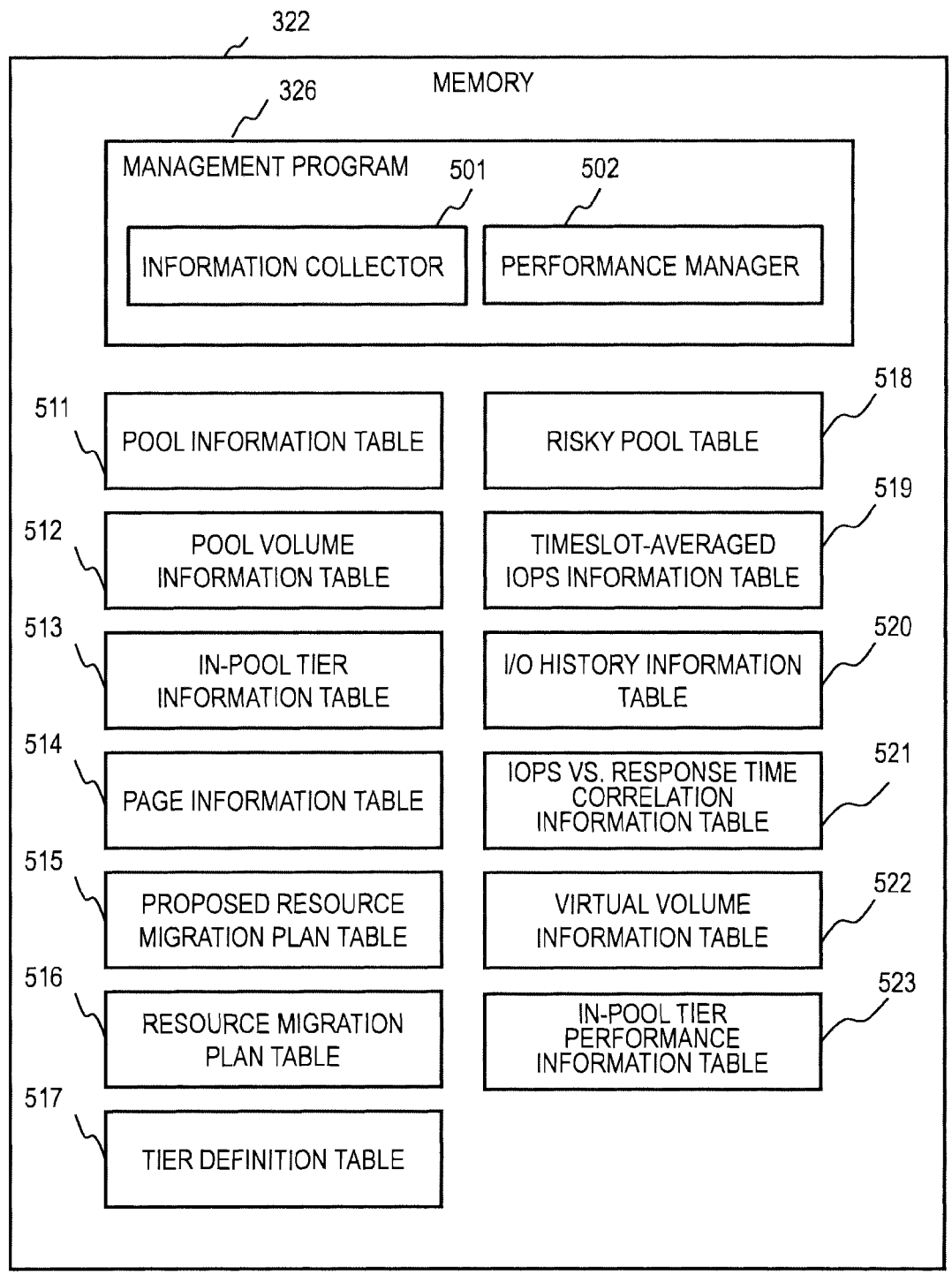
FIG. 5 schematically illustrates a program and information held by a management server in the embodiment.

FIG. 5 schematically illustrates a configuration of the management program 326 in the management server 320 and information used by the management server 320. The memory 322 holds the management program 326; the management program 326 includes information collector 501 and performance manager 502. FIG. 5 shows the management program 326 and tables 511 to 523 within the memory 322 for convenience of explanation, but typically, these data are stored from the secondary storage device 323 to the memory 322.

The information collector 501 of the management program 326 is a function that collects data from the storage systems 340 and stores information in tables. The information collector 501 provides initial settings to the tables. The information manager 502 periodically monitors the performance of virtual volumes. Upon detection of a virtual volume (risky virtual volume) that might become unable to satisfy the performance requirements (SLOs) from the host server 300, the information manager 502 upgrades the performance.

Specifically, the information manager 502 creates plans for storage resource migration from some pool to the risky pool while preventing an SLO violation in the source pool caused by the resource migration. The functions of the management program 326 do not need to be the functions of one program but may be separate program codes. Details of the functions and the operations of the management program 326 will be described later.

As shown in FIG. 5, the memory 322 holds a pool information table 511, a pool volume information table 512, an in-pool tier information table 513, a page information table 514, a proposed resource migration plan table 515, a resource migration plan table 516, a tier definition table 517, a risky pool table 518, a timeslot-averaged IOPS (Input Output Per Second) information table 519. The IOPS is I/O count in a unit time (one second).

The memory 322 further holds an I/O history information table 520, an IOPS vs. response time correlation information table 521, a virtual volume information table 522, and an in-pool tier performance information table 523. The details of these tables will be described later. FIG. 5 shows the tables within the memory 322 for convenience of explanation, but typically, the data required for processing in the management server 320 is loaded from the secondary storage device 323 to the memory 322. Information (or data representing the information) is stored in the memory 322 and storage areas in the secondary storage device 323.

In the example of FIG. 5, information (data) used by the management program 326 is held in the tables. The information held in data storage areas to be used by the system of this embodiment does not depend on data structure but may be expressed in any data structure. For example, a data structure appropriately selected from table, list, database, and queue can store the information.

Figure 6:
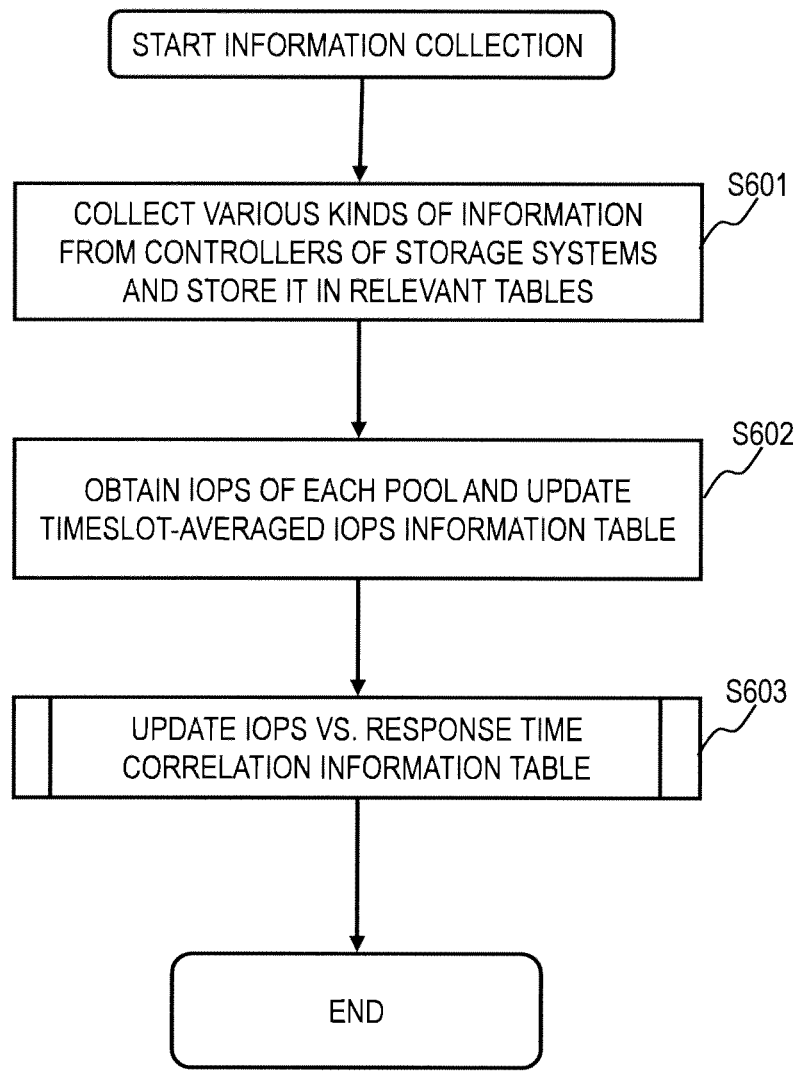
FIG. 6 is a flowchart illustrating an example of information collection in the embodiment.

The management program 326 collects information on each storage system 340 for detecting a risky pool and rearranging the resources between the pools using its information collector 501. FIG. 6 is a flowchart illustrating an example of the information collection. The information collector 501 collects various kinds of information from the controller 341 in the storage system 340 and stores them in the relevant tables periodically (in this example, every ten minutes) (S601).

The kinds of information to be collected and the tables for storing the information will be referred to in the explanation on each table hereinafter. The information other than the information preset by the administrator and the information obtained from the collected information is collected by the information collector 501.

The information collector 501 obtains the latest IOPS in each pool 402 in the storage system 340 from the real time IOPS column 806 in the pool information table 511 (refer to FIG. 8) and updates the timeslot-averaged IOPS column 1203 and the number of updates column 1204 in the record relevant to the pool ID and the time in the timeslot-averaged IOPS information table 519 (refer to FIG. 12) (S602).

To update a value in the timeslot-averaged IOPS column 1203, the information collector 501 multiplies the value contained in the timeslot-averaged IOPS column 1203 of the record by the value contained in the number of updates column 1204 of the record, and then adds the latest IOPS obtained at the foregoing step to the result of the calculation. Furthermore, it divides the result by the value obtained by adding one to the value contained in the record in the number of updates column 1204, and updates the value in the timeslot-averaged IOPS column 1203 of the record with the result.

The information collector 501 further updates the value contained in the number of updates column 1204 of the record with the foregoing value obtained by adding one to the value of the record contained in the number of updates column 1204.

Next, the information collector 501 updates the IOPS vs. response time correlation information table (S603). The information collector 501 updates the IOPS vs. response time correlation information table 521 (refer to FIG. 16) using the information obtained from the controller 341 in the storage system 340 at S601. Details of the updating the IOPS vs. response time correlation information table will be described later with reference to FIG. 14.

FIG. 7 exemplifies the virtual volume information table 522. The virtual volume information table 522 stores information on the pools and the response times of the individual virtual volumes. Specifically, the table has columns of virtual volume IDs 701, pool IDs 702, the upper limits of requested response time 703, and the latest response times 704.

The columns of pool IDs 702 and virtual volume IDs 701 store information of identification information on pools and virtual volumes, respectively. In this description, the nominal designations of information for identifying constituents may be arbitrary, for example, IDs, names, numbers, and the like; they are replaceable with one another. The same applies the other identification information.

The virtual volume information table 522 stores requested response times and the latest actual response times on individual virtual volumes. In creating a virtual volume, the administrator configures the upper limit of the response time requested from the host server to which the virtual volume is provided; the value is stored in the column of the upper limits of requested response time 703.

If the administrator does not set the value, a sufficiently great value (for example, 100 ms) is set for a default. The information collector 501 obtains the latest response time of each virtual volume from the controller 341 of the storage system 340 in the information collection and stores it in the latest response time column 704.

FIG. 8 exemplifies the pool information table 511. The pool information table 511 stores information on monitoring times, periodic inter-tier rearrangements, IOPS, and performance margin percentages for individual pools identified by pool IDs. Specifically, this table 511 has columns of pool IDs 801, start times of monitoring period 802, end times of monitoring period 803, monitoring period cycles 804, execution mode 805, real time IOPS 806, and daily average performance margin percentages 807. The performance margin percentage will be described later.

The information collector 501 monitors individual I/O counts to all pages in each tiered pool in the storage system 340 and stores the values (for example, refer to the page information table 514) for a predetermined time period (monitoring period). The cycle of this monitoring period can be selected by the administrator from every 2 hours, 4 hours, and 8 hours from 0:00 in addition to the default of every 24 hours from 0:00. The value of the cycle of monitoring period is equal to the value of the length of the monitoring period. The administrator can also specify the start time (column 802) and the end time (column 803) instead of configuring the cycle of monitoring period.

The start time of monitoring period and the end time of monitoring period are the start time and the end time, respectively, of a monitoring period to collect the I/O counts to the pages in the pool. The start time corresponding to the default of the cycle (24 hours) is 0:00 and the end time is 0:00 on the next day. The start time includes 0:00 on the dot. The default start times and end times are determined so as to correspond to the individual cycles. The administrator can specify these times.

The real time IOPS is the IOPS to a pool at the time when the information collector 501 collects information from the controller 341 in the storage system 340. This value is updated at the times of periodic collections by the controller 341 in the storage system 340, and in addition, may be obtained as necessary, for example, at a resource migration (S1705) in accordance with a resource migration plan in the performance management illustrated by FIG. 17, or at any other occasion.

The column of execution mode 805 stores data indicating the mode of execution of periodic inter-tier rearrangements. The administrator sets "automatic" or "manual" to the column of execution mode 805. The inter-tier rearrangement in this embodiment reallocates pages to tiers in such a descending order of the I/O count that the page with the highest I/O count will be first relocated to the tier of the highest level, based on the individual I/O counts to the pages in the pool recorded during a monitoring period.

In the automatic execution mode, the controller 341 of a storage system 340 executes inter-tier rearrangement immediately after the end of a monitoring period. The inter-tier rearrangement executed in the automatic execution mode is called periodic inter-tier rearrangement. In the manual execution mode, the inter-tier rearrangement is executed at any time specified by the administrator. In the case of manual execution mode, the start time, the end time, and the cycle of monitoring period are not predetermined. The administrator issues instructions to start a monitoring period and to end it at intended occasions.

FIG. 9 exemplifies the pool volume information table 512 for storing configuration information on pool volumes. The pool volume information table 512 includes columns of pool volume IDs 901, tiers 902, pool volume capacities 903, pool volume unused capacities 904, and pool IDs 905.

The pool volume IDs are identification information of pool volumes. The column of tiers 902 stores identification information of tiers in the pool (identification information of classes of tier). In this example, the capacities are the same in all of the pool volumes (resources) but may be different from one another.

FIG. 10 exemplifies the in-pool tier information table 513. The in-pool tier information table 513 stores configuration information of individual tiers in the pools. The in-pool tier information table 513 includes columns of pool IDs 1001, tiers 1002, the number of constituent resources 1003, and tier capacities 1004. The number of constituent resources is the number of pool volumes in the tier.

FIG. 11 exemplifies the page information table 514. The page information table 514 stores information on volumes and I/O counts of the individual pages. Specifically, the page information table 514 includes columns of pool IDs 1101, page IDs 1102, virtual volume IDs 1103, pool volume IDs 1104, tiers 1105, and the I/O counts in the previous monitoring period 1106.

Each field in the column of tiers 1105 stores the class of the tier in which the page of the record is held. This value is updated at a data evacuation for resource migration and an inter-tier rearrangement.

The column of I/O counts in the previous monitoring period 1106 stores I/O counts to individual pages measured in the previous monitoring period. The information collector 501 obtains the values from the controller 341 of the storage system 340 and stores them in the page information table 514.

FIG. 12 exemplifies the timeslot-averaged IOPS information table 519. The timeslot-averaged IOPS information table 519 includes columns of pool IDs 1201, timeslots 1202, timeslot-averaged IOPS 1203, and the number of updates 1204. The timeslot-averaged IOPS is average of measured IOPS in individual timeslots (10 minutes of timeslots in this example) as explained at S602 in the flowchart of FIG. 6. The information collector 501 updates the values. The updates are performed in cycles of the monitoring period.

FIG. 13 exemplifies the I/O history information table 520. The I/O history information table 520 is a table for storing the history of IOPS in each pool on a periodic basis (every 10 minutes in this example) within the last 48 hours. The I/O history information table 520 includes columns of pool IDs 1301, dates and times 1302, and IOPS 1303. Each field in the column of dates and times 1302 stores the date and time of an IOPS measurement period in the pool designated by the pool ID in a particular record. The information collector 501 obtains IOPS in each pool from the controller 341 of the storage system 340.

Figure 14:
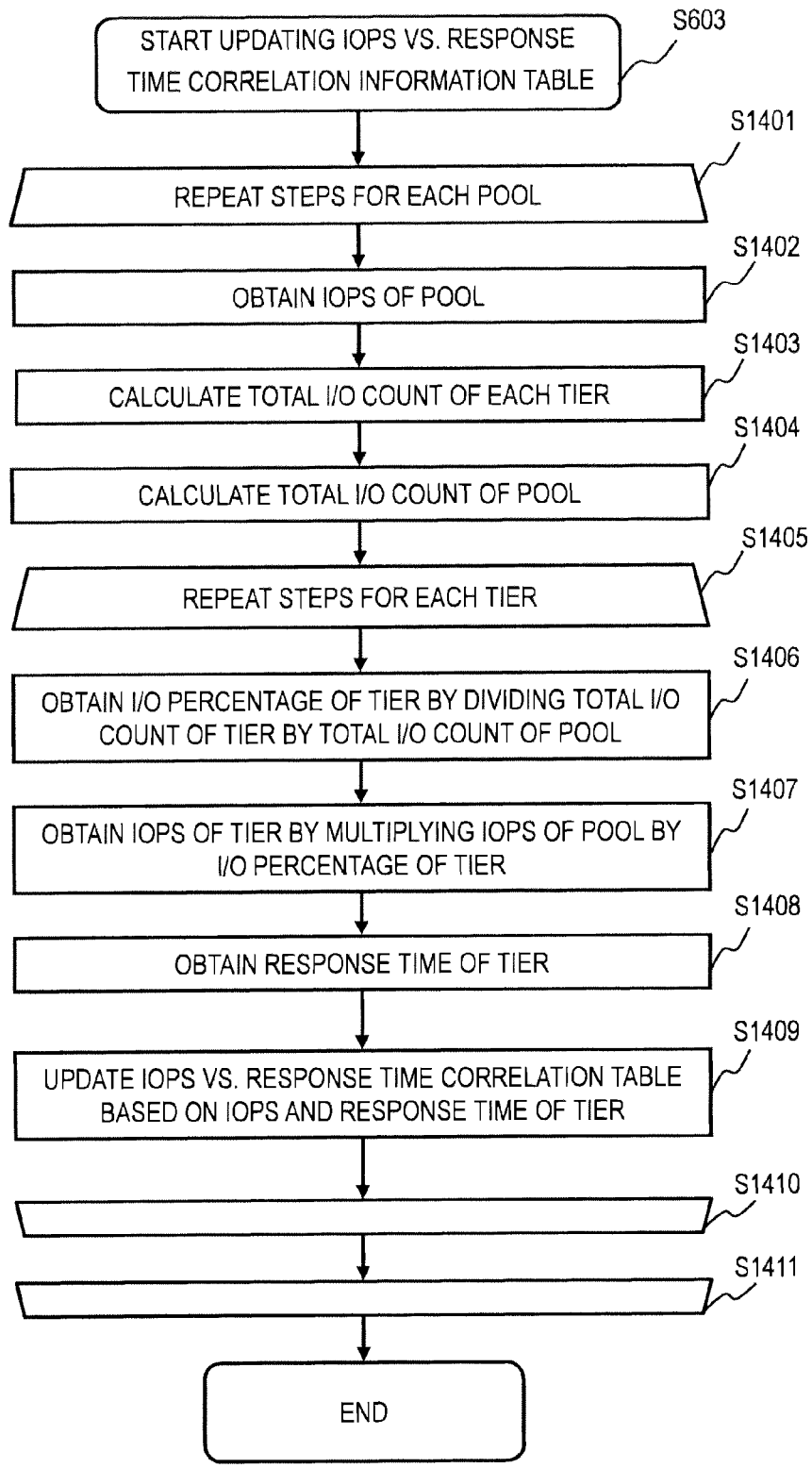
FIG. 14 is a flowchart illustrating an example of updating an IOPS vs. response time correlation information table in this embodiment.

Now, with reference to FIG. 14, updating the IOPS vs. response time correlation information table 521 (S603 in FIG. 6) will be described. Before describing this process, the in-pool tier performance information table 523 and the IOPS vs. response time correlation information table 521, which are used in the processing, will be described.

FIG. 15 exemplifies the in-pool tier performance information table 523. The in-pool tier performance information table 523 stores information on access performance, which is response time in this example, of individual tiers in the pools.

As shown in FIG. 15, the in-pool tier performance information table 523 includes columns of pool IDs 1501, tiers 1502, dates and times 1503, and response times 1504. The information collector 501 obtains the response time of the resources included in each tier in the individual pools from the controller 341 in the storage system 340 and stores it in the column of response times 1504 for the response time of the tier.

FIG. 16 exemplifies the IOPS vs. response time correlation information table 521. The IOPS vs. response time correlation information table 521 stores information indicating correlations between IOPS and response times in each tier in a storage system; the table is referenced to convert TOPS into a response time.

This table 521 is common to all pools in a storage system 340. The IOPS vs. response time correlation information table 521 includes columns of tiers 1601, IOPS ranges 1602, IOPS range-averaged response times 1603, and cumulative I/O counts 1604.

The column of IOPS range-averaged response times 1603 stores averages of response times previously measured by IOPS range. In this example, these averages are averages weighted by I/O count. The column of cumulative I/O counts 1604 stores cumulative I/O counts as measured by IOPS range in previous monitoring.

Returning to FIG. 14, the updating the IOPS vs. response time correlation information table 521 is carried out in the information collection. In processing this updating, the information collector 501 repeats the steps between S1401 and S1411 for each pool.

First, the information collector 501 obtains the latest IOPS of a particular pool with reference to the I/O history information table 520 (S1402). The information collector 501 refers to the page information table 514 and sums up the values in the column of I/O counts in previous monitoring period 1106 of the record having the same value in the column of tiers 1105 to obtain the total I/O count of each tier (S1403). The information collector 501 further sums up the total I/O counts of the tiers in the same pool to obtain the total I/O count of the pool (S1404).

The information collector 501 repeats the steps between S1405 and S1410 for individual tiers. First, the information collector 501 divides the total I/O count of a particular tier calculated at S1403 by the total I/O count of the pool calculated at S1404 to obtain an I/O percentage of the tier (S1406). The information collector 501 multiplies the IOPS of the pool obtained at S1402 by the I/O percentage of the tier obtained at the step S1404 to obtain the IOPS of the tier (S1407).

The information collector 501 refers to the in-pool tier performance information table 523 and obtains the latest response time of the tier (S1408). The information collector 501 updates the value in the column of IOPS range-averaged response times 1603 in the IOPS vs. response time correlation information table 521 based on the IOPS of the tier obtained at S1408 and the IOPS of the tier obtained at S1407 (S1409). Moreover, the information collector 501 updates the column of cumulative I/O counts 1604.

Specifically, the information collector 501 refers to the columns of tiers 1601 and IOPS ranges 1602 in the IOPS vs. response time correlation information table 521 and uses the identification information and the IOPS of the tier as a key to select a relevant record from the IOPS vs. response time correlation information table 521.

The information collector 501 multiplies the value stored in the column (field) of IOPS range-averaged response times 1603 of the record by the cumulative I/O count stored in the column (field) of cumulative I/O count 1604 of the same record (total 1). Furthermore, the information collector 501 multiplies the latest response time of the tier obtained at S1408 by the total I/O count of the tier obtained at S1403 (total 2).

The information collector 501 sums the total 1 and the total 2 (total sum 1). Furthermore, it sums the cumulative I/O count of the record and the total I/O count of the tier obtained at S1403 (total sum 2). This total sum 2 is the new value to update the cumulative I/O count.

The information collector 501 divides the total sum 1 by the total sum 2. The result of this calculation is the new value to update the IOPS range-averaged response time and the average of response time weighted by the I/O count. The information collector 501 stores the update value in the column of IOPS range-averaged response times 1603 of the record. The information collector 501 stores the sum (total sum 2) of the cumulative I/O count of the record and the IOPS of the tier obtained at S1406 to the column of cumulative I/O counts 1604 of the record.

Figure 17:
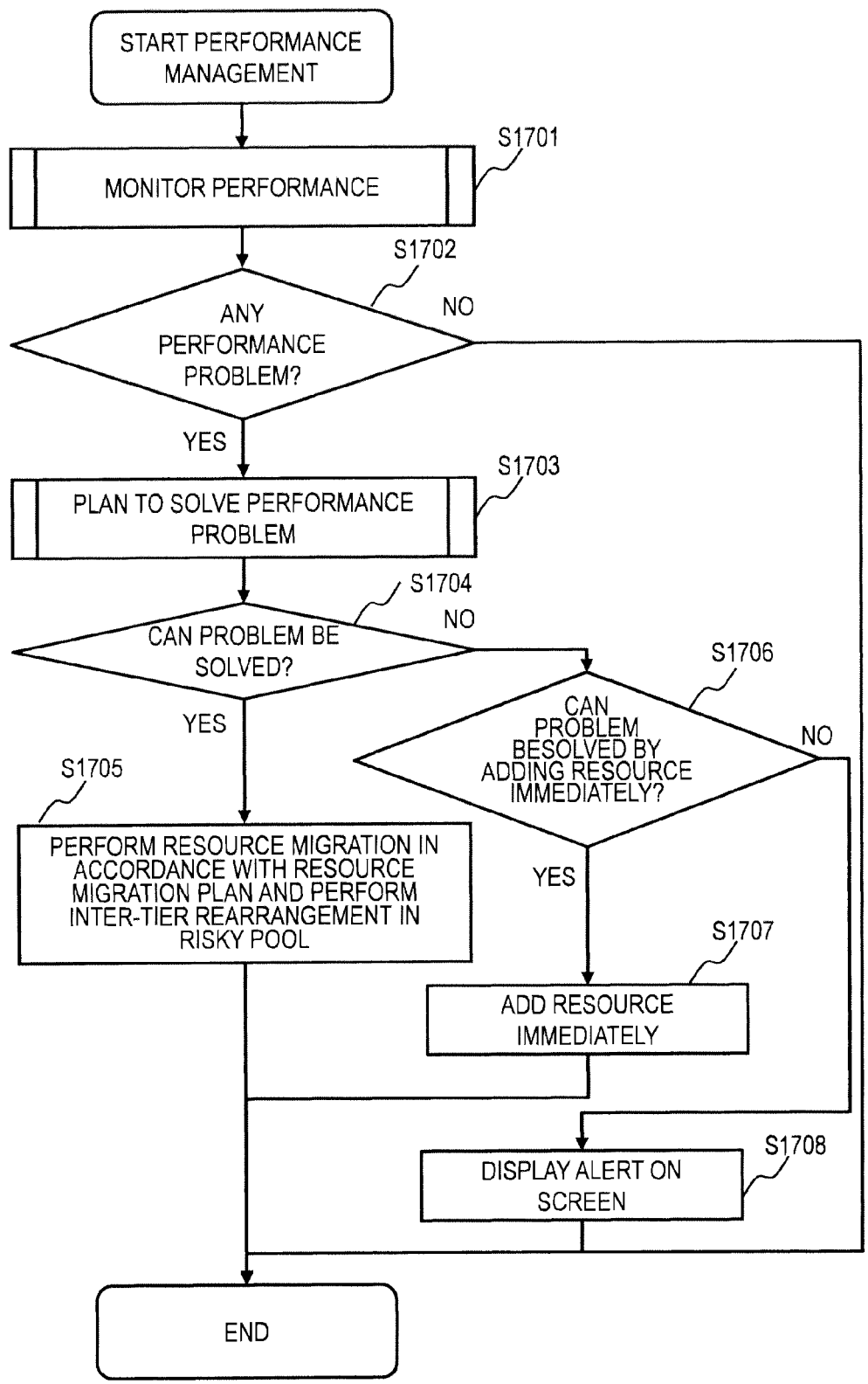
FIG. 17 is a flowchart of performance management in this embodiment.

Hereinafter, performance management by the management server 320 will be described. The performance manager 502 in the management program 326 carries out the performance management using information collected by the information collector 501. FIG. 17 is a flowchart of an example of the performance management. Before describing the process with reference to the flowchart of FIG. 17, the outline of processing by the performance manager 502 will be described.

The performance manager 502 checks the usage of performance of individual pools in each storage system 340 for a pool with insufficient performance capability (risky pool).

Upon detection of a risky pool, the performance manager 502 carries out a procedure for upgrading the performance of the risky pool.

Specifically, the performance manager 502 figures out the kind and the amount of resource (pool volume) required to add. The performance manager 502 determines a pool which is expected not to violate the SLOs after a resource of the kind and the amount figured out is deallocated therefrom and an inter-tier rearrangement is carried out therein, by simulation. The performance manager 502 adds such a pool which is determined to allow resource deallocation without SLO violation to source pool candidates.

After applying the above-described process to all of the pools, preferably, the performance manager 502 selects the pool for which the completion time of resource deallocation (the time to add the resource to a risky pool) is the earliest from the source pool candidates as the source pool. Generally, the completion time of a resource deallocation coincides with the completion time of the related data evacuation. If a plurality of pools exist that can complete resource deallocation at the earliest time, it is preferable to select the pool in which the lowest performance degradation is expected after the inter-tier rearrangement.

Specifically, the performance manager 502 calculates the start time of resource migration and the completion time of resource deallocation (the completion time of data evacuation) with which an SLO violation will not occur from the start of the resource migration until the completion of the inter-tier rearrangement, in both of the cases where the inter-tier rearrangement is performed immediately after the resource has been deallocated from the pool and is not performed immediately, for each source pool candidate.

If it finds the start time of resource migration and the completion time of resource deallocation with which no SLO violation will occur in either case, it selects the case that includes the earlier completion time of resource deallocation (the earlier time available for addition to a risky pool) as the plan to provide resources from the pool.

The performance manager 502 starts resource migration (resource deallocation and addition to the risky pool) from the source pool that offers the plan including the earliest completion time of resource deallocation at the start time of the resource deallocation in the plan. In a preferable configuration, the performance manager 502 obtains real time I/O information during data evacuation. If the performance manager 502 finds a possibility of SLO violation as the actual I/O count is more than the estimation, it aborts the resource migration. The performance manager 502 does not need to monitor the real time I/Os.

The performance manager 502 predicts whether an SLO violation will occur in the risky pool by the same method as for the source pool. If an SLO violation is more likely to occur, the performance manager 502 determines whether adding a volume which does not belong to any pool prevents the SLO violation, by simulation.

If it determines that the SLO violation can be prevented, the performance manager 502 adds an unused volume which does not belong to any pool. If it determines that the SLO violation cannot be prevented, the performance manager 502 displays on the screen of the input and output device 324 that an SLO violation is more likely to occur in the risky pool and adding a volume to the pool cannot eliminate the SLO violation to notify the administrator.

Now with reference to FIG. 17, performance management will be described. The performance manager 502 carries out performance monitoring (S1701). Specifically, the performance manager 502 checks performance of the virtual volumes 401 and the pools 402 in a storage system 340 to detect a virtual volume 401 which has a performance problem. The performance manager 502 adds the ID and the performance margin percentage of the pool (risky pool) to which the virtual volume 401 belongs to a risky pool table 518. Details of the performance margin percentage and performance monitoring (S1701) will be described later with reference to FIG. 18.

FIG. 19 exemplifies the risky pool table 518. The risky pool table 518 includes columns of risky pool IDs 1901 and virtual volume performance margin percentages 1902. The column of risky pool IDs 1901 stores the IDs of the pools which has been determined to be risky pools in the performance monitoring and the column of virtual volume performance margin percentages 1902 stores performance margin percentages of (the virtual volumes of) the pools.

Returning to FIG. 17, the performance manager 502 determines whether any performance problem exists (S1702) in view of the result of performance monitoring carried out at S1701. If a performance problem exists (YES at S1702), the performance manager 502 executes S1703. If no performance problem exists at S1701 (NO at S1702), the performance manager 502 terminates the processing.

At S1703, the performance manager 502 executes planning to solve the performance problem to create a plan for upgrading the performance of the pool which has the performance problem detected at S1701. Specifically, the performance manager 502 creates proposed plans for migration of a resource (real volume) in another pool in the storage system 340 to the risky pool and stores them in a proposed resource migration plan table 515. The details of the planning to solve the performance problem (S1703) will be described later with reference to FIG. 20. The details of the proposed resource migration plan table 515 will be described later with reference to FIG. 24.

In response to the result of the planning to solve the performance problem at S1703, the performance manager 502 determines whether a pool-to-pool resource migration can solve the performance problem in the risky pool detected at S1701 (S1704). If it can solve the performance problem in the risky (YES at S1704), the performance manager 502 executes S1705. If it cannot solve the performance problem in the risky pool (NO at S104), the performance manager 502 executes S1706.

At S1706, the performance manager 502 determines whether immediate addition of an unused resource in the storage system 340 to the risky pool prevents an SLO violation in the risky pool. If it determines that the SLO violation can be prevented (YES at S1706), the performance manager 502 executes S1707. If it determines that the SLO violation cannot be prevented (NO at S1706), the performance manager 502 executes S1708.

In the determination at S1706, the performance manager 502 can apply the same method as in creating a resource migration plan (refer to S2004 in FIG. 20 and FIG. 23), which is invoked in the planning to solve the performance problem (S1703), to the risky pool.

Specifically, the performance manager 502 predicts a page arrangement after adding an unused resource to the risky pool immediately and subsequent rebalancing pages in the risky pool (in-tier page rearrangement), and estimates response times of the risky pool in individual timeslots after the addition of the resource while considering the history information together. The rebalancing will be described in the explanation of S1707.

This estimating the response times may use the same method as in the estimating the response times after the resource migration in the source pool. The performance manager 502 checks whether the risky pool violates the SLOs based on the estimated response time. The details of the creating a resource migration plan (S2004) will be described later.

At S1707, the performance manager 502 immediately adds a resource in the storage system 340 to the risky pool. The performance manager 502 rebalances the pages in each tier. The rebalancing arranges the pages in the tier so that the I/O count in the provided page will be uniform among the resources (pool volumes) in the tier.

At S1708, the performance manager 502 displays an alert in a window of the management program to inform the administrator that the performance problem of the risky pool is difficult to be solved by adding a resource to the risky pool.

As previously described, if the performance problem of the risky pool can be solved by a pool-to-pool resource migration (YES at S1704), the performance manager 502 executes S1705. The performance manager 502 performs a resource migration based on the resource migration plan created at S1703. Specifically, the performance manager 502 refers to the resource migration plan table 516 and performs the resource migration in accordance with a record in the resource migration plan table 516.

The performance manager 502 instructs the controller 341 in the storage system 340 of resource migration; the controller performs resource migration from the source pool to the risky pool in accordance with the instruction. The controller 341 evacuates the data in the resource for migration to a free resource in the source pool and adds the resource from the source pool to the risky pool. The controller 341 executes an inter-tier rearrangement after resource deallocation or a periodic inter-tier rearrangement in the source pool as necessary.

FIG. 27 exemplifies the resource migration plan table 516. The resource migration plan table 516 is a table that stores the resource migration plan adopted from proposed resource migration plans in the creating a resource migration plan (S2004), which will be described later with reference to FIG. 23. The performance manager 502 carries out resource migration based on the information in the resource migration plan table 516. The details of the resource migration plan table 516 will be described later.

Together with the resource migration, the performance manager 502 deallocates the resource for migration from the source pool, where the deallocation includes data evacuation from the resource for migration, adds the resource for migration to the risky pool, rebalances the resources in the tier in the risky pool to which the resource has been added (in-tier page rearrangement), and carries out an inter-tier rearrangement in the source pool.

In this example, to deallocate a pool volume (resource) from a pool, the performance manager 502 evacuates the pages allocated to the pool volume to be deallocated from the pool to another pool volume in the same pool. Specifically, the performance manager 502 evacuates the pages to be evacuated to a free area in a pool volume in the tier to which the pool volume to be deallocated belongs.

If no sufficient free space exists in any pool volume in the same tier, the performance manager 502 evacuates the remaining pages to be evacuated to a free area in a pool volume in the tier higher by one level. If there is no tier higher by one level, that is, the pool volume to be deallocated belongs to the highest tier, or if no sufficient free area exists in any pool volume in the tier higher by one level, the performance manager 502 evacuates the remaining pages to a pool volume in the tier lower by one level.

If no sufficient free space exists in any pool volume in the tier lower by one level, the performance manager 502 evacuates the remaining pages to a pool volume in the tier lower by one more level (if any). The performance manager 502 repeats this searching for an evacuation destination by this method.

If no free space enough to evacuate all the pages to be evacuated exists in the pool, the deallocation of the pool volume from the pool fails. Since data in a tier are distributed to the pool volumes that constitute the tier, the pages to be evacuated are distributed among free pool volumes and are written thereto.

In this configuration example, the order of evacuating the pages to be evacuated descends from the page with the highest I/O count measured in a monitoring period. For more accurate performance estimation, established rules of page evacuation are necessary, but the method of page evacuation may be different from the above-described one.

During a resource migration (data evacuation), the performance manager 502 refers to the pool information table 511 at predetermined intervals to monitor the real time IOPS of the source pool. If the real time IOPS is more than the IOPS of the source pool estimated in the planning to solve the performance problem at S1703 and the performance manager 502 determines that an SLO violation is likely to occur, it aborts the execution of the resource migration. The performance manager 502 displays an alert on the monitor screen of the management server 320 to notify the administrator of it.

To determine whether an SLO violation is likely to occur because of higher real time IOPS of the source pool than the estimation, the performance manager 502 may use the following method, for example. The performance manager 502 calculates an approximated linear line of the real time IOPS at given intervals by the least squares. The performance manager 502 calculates the deviation of the values of the approximated line at constant intervals from the estimated IOPS values, which are lower than those in the approximated linear function.

If the deviation is increasing and the difference between the sum of the estimated peak value of the IOPS and the current deviation and the IOPS for the response time required by the SLOs is smaller than a predetermined threshold value, the performance manager 502 determines that the source pool is more likely to violate the SLOs.

Figure 18:
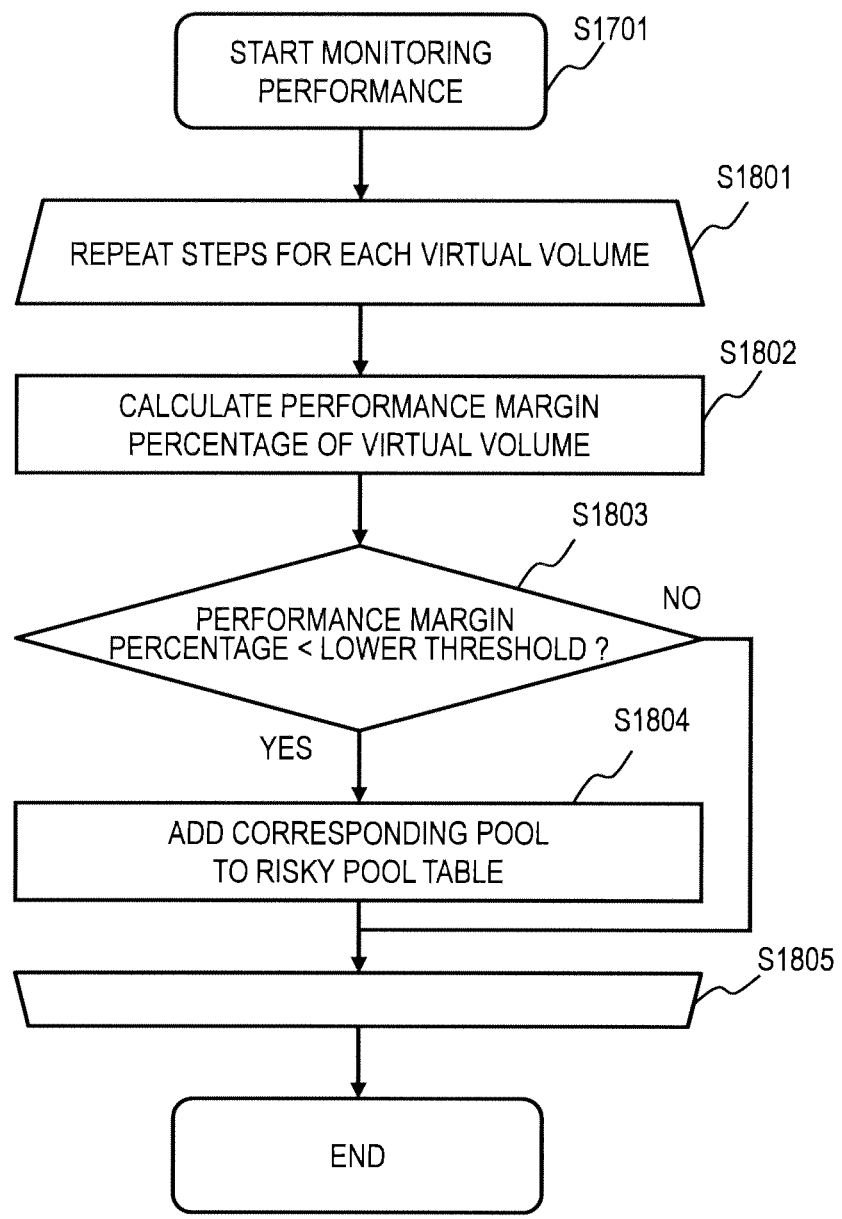
FIG. 18 is a flowchart illustrating an example of performance monitoring in this embodiment.

Now, with reference to the flowchart of FIG. 18, an example of the performance monitoring (S1701) invoked in the performance management will be described. The performance manager 502 repeats the steps between S1801 and S1805 for each virtual volume. The performance manager 502 calculates a performance margin percentage of a virtual volume (S1802). Specifically, the performance manager 502 refers to the virtual volume information table 522 to calculate the performance margin percentage from the latest response time and the upper limit of requested response time on the virtual volume using the following formula:

Performance margin percentage of a virtual volume (%)=(100−(latest response time/upper limit of requested response time)×100)

Next, the performance manager 502 determines whether the performance margin percentage of the virtual volume obtained at S1802 is less than the lower threshold of the performance margin percentage predetermined by the administrator (S1803). If the performance margin percentage is less than the threshold (YES at S1803), the performance manager 502 executes S1804. If the performance margin percentage is more than the threshold (NO at S1803), the performance manager 502 terminates the processing on the virtual volume.

At S1804, the performance manager 502 determines that the pool of which the performance margin percentage is less than the lower threshold at S1803 to be a risky pool and adds information on the risky pool (the pool ID and the performance margin percentage of the virtual volume) to the risky pool table 518.

Figure 20:
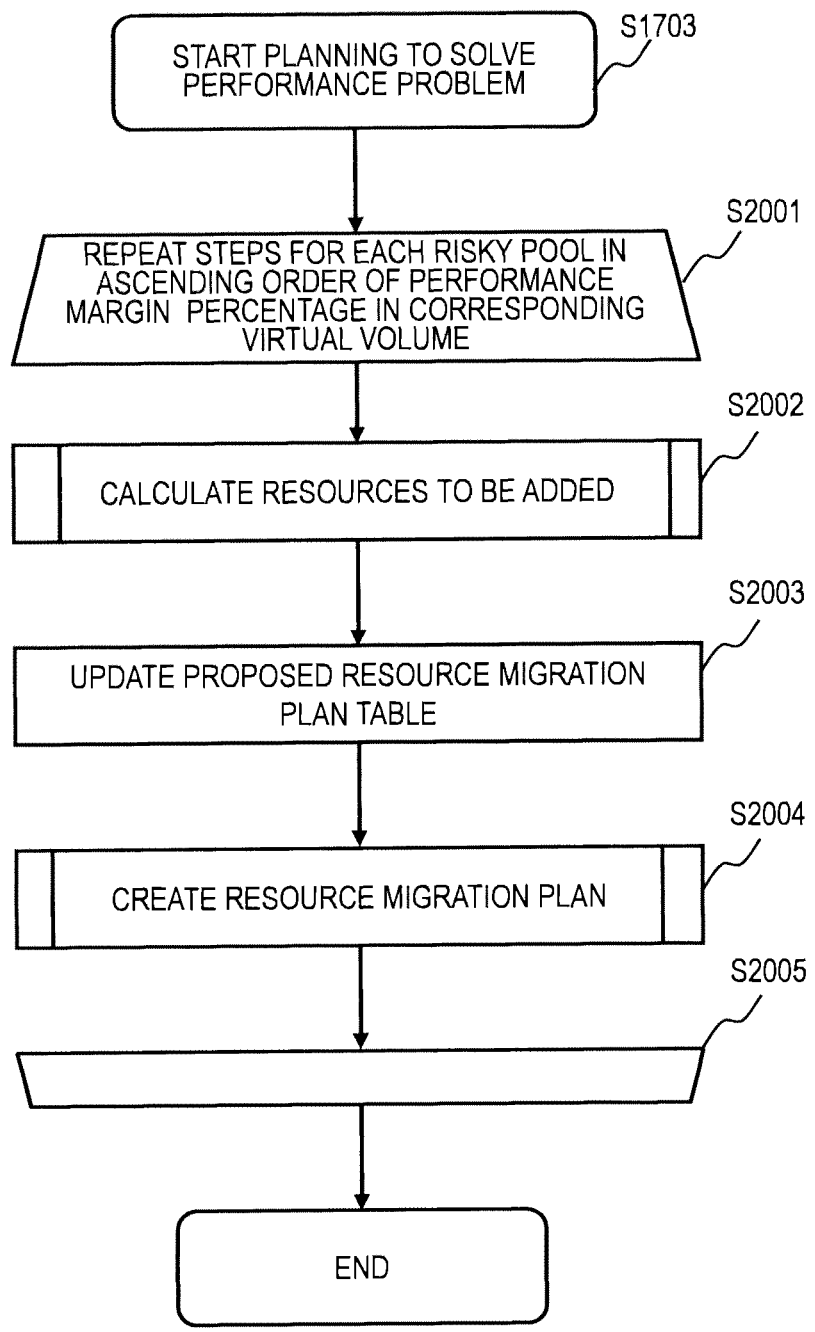
FIG. 20 is a flowchart illustrating an example of planning to solve a performance problem in this embodiment.

With reference to the flowchart of FIG. 20, an example of planning to solve the performance problem (S1703) will be described. The planning to solve the performance problem (S1703) is invoked in the performance management (refer to FIG. 17).

The performance manager 502 refers to the risky pool table 518 and repeats the steps between S2001 and S2005 for the risky pools in the ascending order of the performance margin percentage. At S2002, the performance manager 502 calculates the resources to be added to upgrade the performance of the risky pool. In this step, it calculates how much additional resources are necessary and to which tier in the risky pool the resources are to be added. The details of the calculating the resources to be added (S2002) will be described later with reference to FIG. 21.

Next, the performance manager 502 calculates daily averages of performance margin percentages and daily averages of performance margin percentages after resource deallocation of the pools except for the risky pool and updates the proposed resource migration plan table 515 (S2003). The proposed resource migration plan table 515 stores a list of proposed resource migration plans to upgrade the performance of the risky pool.

FIG. 24 exemplifies the proposed resource migration plan table 515. The proposed resource migration plan table 515 includes columns of source pool IDs 2401, immediate inter-tier rearrangement 2402, start times of resource migration 2403, expected completion times of resource deallocation 2404, daily averages of performance margin percentage 2405, and daily averages of performance margin percentage after resource deallocation 2406.

Returning to S2003 in FIG. 20, the performance manager 502 first calculates a daily average of response times of the pool (a pool except for the risky pool). The performance manager 502 refers to the in-pool tier performance information table 523, obtains the response times in the timeslots back to 24 hours before the current timeslot for each tier, and calculates the average.

Furthermore, it calculates the sum of the I/O counts of all pages in each tier in the pool from the column of I/O counts in the previous monitoring period 1106 in the page information table 514. This value is the total I/O count in each tier. The performance manager 502 calculates a daily average response time of the pool by applying the foregoing values to the following formula:

Daily average response time of a pool=(Σ(total I/O count of each tier×daily average response time of each tier))/total I/O count of the pool Next, the performance manager 502 calculates the performance margin percentage of the pool using the formula below, based on the daily average response time of the pool. In the formula, the upper limit of the requested response time is, for example, the smallest value of the upper limits of the requested response times provided to all of the virtual volumes in the pool.

Daily average performance margin percentage of a pool (%)=100−(daily average response time of the pool/the upper limit of requested response time)×100

The performance manager 502 adds the pool ID and the obtained daily average of performance margin percentage to the proposed resource migration plan table 515. Moreover, it updates the column of daily average performance margin percentage 807 of the record of the pool in the pool information table 511.

Next, the performance manager 502 calculates the daily average response time of the pool after resource deallocation. The performance manager 502 predicts a page arrangement after the resources to be added to the risky pool calculated at S2001 is deallocated from the pool and an inter-tier rearrangement is carried out. The performance manager 502 calculates the estimated total I/O count in each tier in the pool based on the page arrangement. Then, it estimates the daily average response time of the pool after resource deallocation using the following formula:

Estimated daily average response time of a pool=($\Sigma$ (estimated total I/O count of each tier×daily average response time of each tier))/total I/O count of the pool Next, the performance manager 502 calculates the daily average performance margin percentage of the pool by applying the estimated daily average of response time of the pool to the following formula:

Daily average performance margin percentage after resource deallocation (%)=100−(estimated daily average response time of the pool/the upper limit of requested response time)×100

The performance manager 502 updates the column of daily average performance margin percentage after resource migration 2406 of the record of the pool in the proposed resource migration plan table 515. At S2004, the performance manager 502 creates a resource migration plan. The details of the creating a resource migration plan will be described later with reference to FIG. 23.

Figure 21:
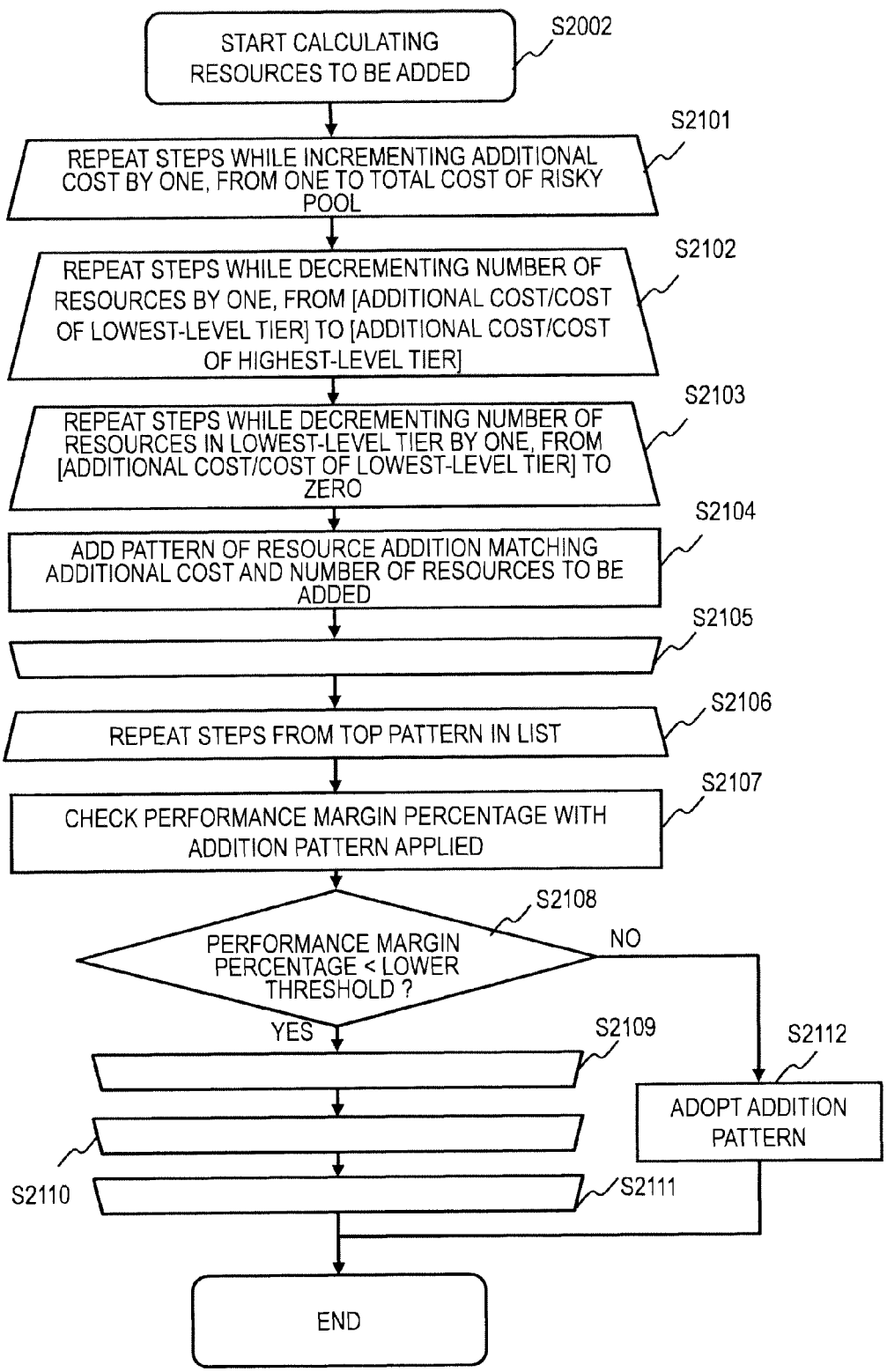
FIG. 21 is a flowchart illustrating an example of calculating resources to be added in this embodiment.

Now, with reference to FIG. 21, an example of calculating resources to be added (S2002) will be described. This process calculates resources necessary to be add to a risky pool. The performance manager 502 repeats the steps between S2101 and S2111 while incrementing additional cost from one to the total cost of the risky pool.

The additional cost is the total cost of the resources to be added to the risky pool. The tier definition table 517 holds the cost of each kind of drive. The cost is calculated from the price of the drive per unit amount of capacity, for example. FIG. 22 exemplifies the tier definition table 217. The tier definition table 517 stores the kind of constituent drive of each tier, the cost per pool volume (resource) therein, and the transfer capability of the drives that constitute the tier.

That is to say, the tier definition table 517 has a column for storing the levels of tier 2201, columns of the kinds of drive 2202, costs 2203, and transfer capabilities 2204. Since the capacities of the pool volumes are the same in this embodiment, the tier definition table 517 stores costs per pool volume (resource), but may store costs per specific amount of capacity. The values contained in this table 517 are predetermined by the administrator.

It is preferable that the performance required by the risky pool be ensured at a least additional cost (the total cost of the pool volumes that migrates from the source pool to the risky pool). Hence, the performance manager 502 calculates volume patterns (resource patterns) which can be added at each additional cost and checks the performance of the risky pool in the case where the volumes in each pattern are added to the risky pool, while incrementing the additional cost. If the performance of the risky pool satisfies the SLOs, the performance manager 502 adopts the volume addition pattern.

Depending on the design, the volume addition pattern may be determined regardless of the additional cost. For example, the performance manager 502 may select volumes one by one from the one showing the highest performance or the lowest performance to determine the volume addition pattern with which the performance of the risky pool satisfies the SLOs.

The volume addition pattern is a pattern for indicating the number of pool volumes (resources) to be added to each tier in the risky pool. Namely, it indicates how many pool volumes (resources) should be added to each tier in the risky pool. For example, an example of a pattern indicates the number of volumes to be added to the Tier 0 is 0, the number of volumes to be added to the Tier 1 is 1, and the number of volumes to be added to the Tier 2 is 2.

Returning to FIG. 21, the performance manager 502 repeats the steps between S2102 and S2110 while decrementing the number of resources to be added from (the additional cost/the cost of the tier of the lowest level) to (the additional cost/the cost of the tier of the highest level). The performance manager 502 further repeats the steps between S2103 to S2105 while decrementing the number of resources in the tier of the lowest level from (the additional cost/the cost of the tier of the lowest level) to zero. In this way, this example starts the simulation from the volume addition pattern including more pool volumes (resources) in a tier of a lower level.

At S2104, the performance manager 502 adds a resource addition pattern matched in the additional cost and the number of resources to be added. The performance manager 502 repeats the steps between S2106 and S2109 from the top resource addition pattern in the list. At S2107, the performance manager 502 checks the performance margin percentage in the case where the addition pattern is adopted.

At S2108, the performance manager 502 compares the performance margin percentage after the addition of the volume with the lower threshold. If the performance margin percentage is equal to or more than the lower threshold (NO at S2108), the performance manager 502 adopts the addition pattern (S2112). If the performance margin percentage is less than the lower threshold (YES at S2108), the performance manager 502 repeats the loop.

At the checking the performance margin percentage at S2107, the performance manager 502 can apply the same method as the one in the creating a resource migration plan (refer to S2004 in FIG. 20 and FIG. 23) to the risky pool.

Specifically, the performance manager 502 predicts a page arrangement after the pool volumes have been added to the risky pool in accordance with the addition pattern and the subsequent page rebalancing in the risky pool (in-tier page rearrangement) has been performed. Moreover, it estimates the response times in the risky pool in individual slots after the addition of the pool volumes, based on the prediction of the page arrangement and the history information. The same method as the estimation of the response times of the source pool after resource migration may apply to this estimation. The performance manager 502 checks whether the risky pool is likely to violate the SLOs based on the estimated response times.

The above-described method of determining the additional resource pattern is merely an example; the performance manager 502 may use a different method. For example, the performance manager 502 may determine the additional resource pattern so that the number of highest-level resources will be the greatest.

Figure 23:
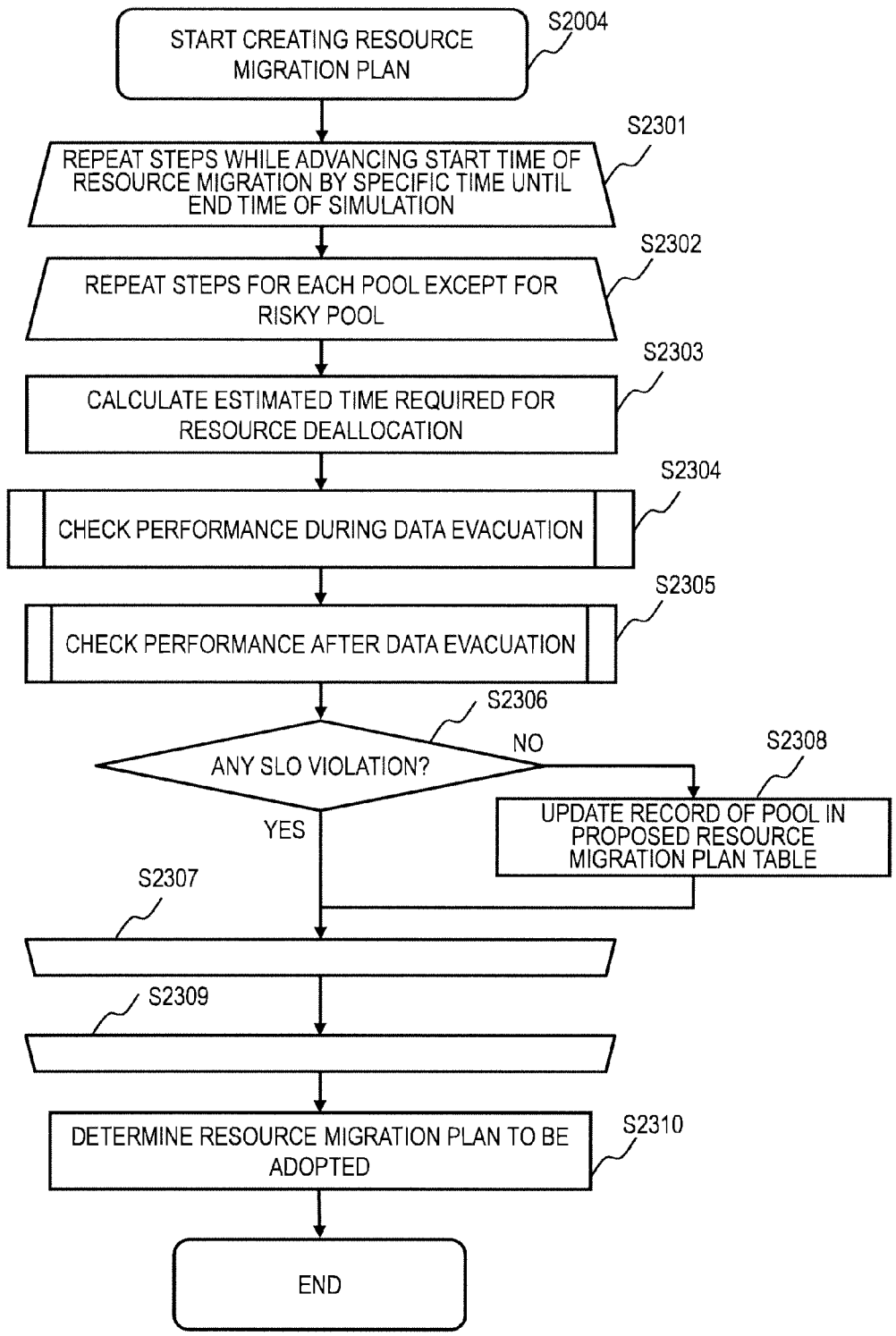
FIG. 23 is a flowchart illustrating an example of creating a resource migration plan in this embodiment.

With reference to FIG. 23, an example of creating a resource migration plan (S2004) will be described. In the flowchart of FIG. 23, the performance manager 502 repeats the steps between S2301 and S2309 while advancing the start time of resource migration (the start time of data evacuation in the source pool) from the execution time of this process until the end time of simulation by a predetermined time. The time may be 10 minutes, for example, and are typically, constant.

In this example, the end time of simulation is 24 hours later than the execution time of this process, namely, the time of detection of a risky pool. This is because the cycle of variation in I/O load to a virtual volume is assumed to be 24 hours. Instead of the time 24 hours later, it may be the time after the time obtained by deducting an estimated time required for an inter-tier rearrangement in the risky pool from 24 hours.

The performance manager 502 calculates the time required for an inter-tier rearrangement by the same method as the one in calculating the estimated time required for a resource deallocation (S2303), which will be described below.

The performance manager 502 repeats the steps between S2302 and S2307 for individual pools except for the risky pool. The performance manager 502 calculates the estimated time required for a resource deallocation at S2303. Specifically, the performance manager 502 calculates the amount of data to be transferred in each transfer path, obtains the transfer rate of each transfer path, and calculates the estimated time required for the resource deallocation based on the amount of data to be transferred in each transfer path and the transfer rate of each transfer path. Transfer paths are the transfer paths between tiers in a pool.

In calculating the amount of data to be transferred in each transfer path, the performance manager 502 searches the pool volume information table 512 with a key of the pool volume ID of the resource to be deallocated, obtains the capacity of the pool volume and the amount of unused capacity thereof, and calculates the amount of used capacity of the pool volume. It searches for pool volumes having free space in the pool volumes belonging to the same pool.

The performance manager 502 determines destination tiers of the pages to be evacuated. The page evacuation procedure to deallocate a resource from a pool, which has been described at S1705, determines the destination tier of each page to be evacuated. The performance manager 502 obtains the amount of data to be transferred in each pair (transfer path) of the source tier of a page (the tier to which the resource (pool volume) to be deallocated belongs to) and the destination tier.

Moreover, the performance manager 502 obtains transfer rates in the individual transfer paths in transferring data between tiers in the pool. To obtain a transfer rate in a specific transfer path, the performance manager 502 refers to the tier definition table 517 and obtains the transfer capabilities of the source tier and the destination tier of the data. The performance manager 502 uses the lower transfer rate as the one of the transfer path.

The performance manager 502 calculates an estimate time required for a resource deallocation using the following formula with the amounts of data to be transferred and the transfer rates in the transfer paths.

Estimated time required for a resource deallocation=Σ [in each transfer path](the amount of data to be transferred in the transfer path/the transfer rate of the transfer path)

Next, the performance manager 502 checks the performance during data evacuation (S2304). The performance check during data evacuation will be described later in detail with reference to FIG. 25. Moreover, the performance manager 502 checks the performance after the data evacuation (S2305). The performance check after data evacuation will be described later in detail with reference to FIG. 26.

Based on the result of the performance check during data evacuation (S2304) and the performance check after data evacuation (S2305), the performance manager 502 determines whether an SLO violation occurs (S2306). If no SLO violation occurs (NO at S2306), the performance manager 502 updates the record of the relevant pool in the proposed resource migration plan table 515 (S2308) and proceeds to S2307. If an SLO violation occurs (YES at S2306), the performance manager 502 proceeds to S2307.

After finishing the foregoing double loops, at S2310, the performance manager 502 determines a resource migration plan to be adopted. Specifically, the performance manager 502 refers to the proposed resource migration plan table 515 and searches for a record (resource migration plan) in which the expected completion time of resource deallocation (expected completion time of data evacuation) is the earliest. If such a plan is uniquely determined, the performance manager 502 adopts the resource migration plan.

If there are a plurality of resource migration plans in which the expected completion times of deallocation are the same, the performance manager 502 searches for a resource migration plan having the highest performance margin percentage of the pool after resource deallocation (after resource migration). If such a plan is uniquely determined, the performance manager 502 adopts the resource migration plan.

If there are a plurality of resource migration plans in which the performance margin percentages are the same (under the condition where the source pool has been determined), the performance manager 502 adopts a resource migration plan having the value of NO in the field in the column of immediate inter-tier rearrangement 2402.

The performance manager 502 updates the resource migration plan table 516 based on the adopted resource migration plan. FIG. 27 exemplifies the resource migration plan table 516. The resource migration plan table 516 has columns of source pool IDs 2701, destination pool IDs 2702, migration resource IDs 2703, immediate inter-tier rearrangement 2704, and the start times of migration 2705.

The performance manager 502 obtains the values to be stored in the column (fields) of migration resource IDs 2703 in the resource migration plan table 516 from the pool information table 511. Specifically, with reference to the pool information table 511, the performance manager 502 searches the resources (pool volumes) that constitute the source pool for the resources to be added to the risky pool that have been obtained in the calculating resources to be added (S2002) in FIG. 21, and stores the values of the matched resources.

It is preferable to select a resource migration plan by the above-described method, but the performance manager 502 may select an appropriate resource migration plan from a plurality of proposed resource migration plans by a different method. The order of priority of selection criteria may be different from the one in the above description; an arbitrary plan may be selected from the proposed plans having the same start time of resource migration.

Figure 28A:
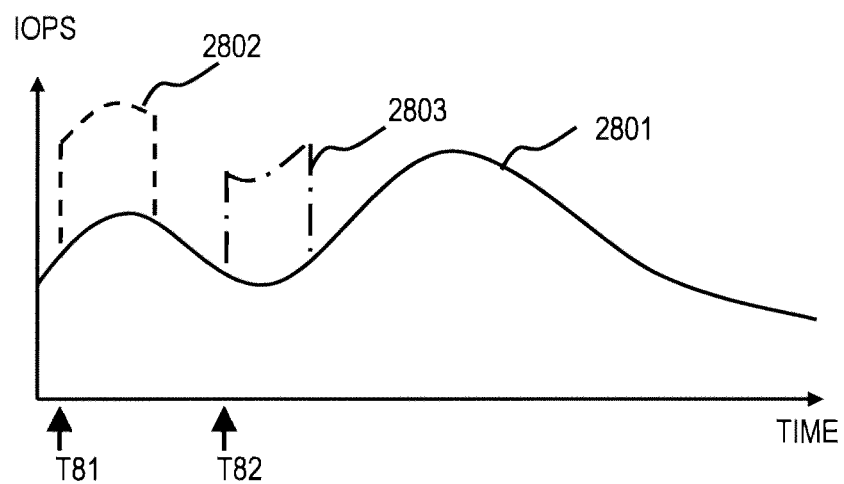
FIG. 28A is a graph schematically illustrating estimated performance of a source pool after starting resource migration (data evacuation) in this embodiment.
Figure 28B:
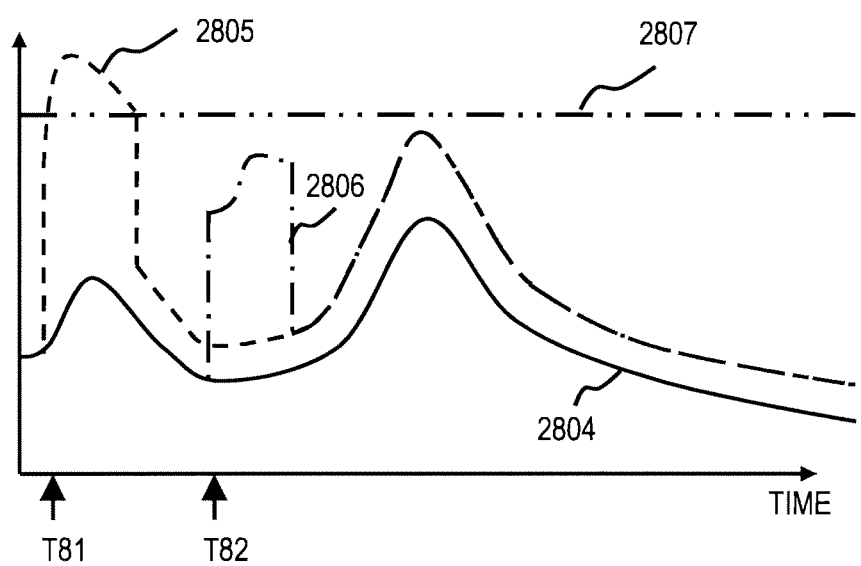
FIG. 28B is a graph schematically illustrating estimated performance of a source pool after starting resource migration (data evacuation) in this embodiment.

Hereinafter, the performance check during data evacuation (S2304) and the performance check after data evacuation (S2305) will be described. FIG. 28A and FIG. 28B schematically show examples of graphs of estimated performance. FIG. 28A illustrates the time variation of IOPS. FIG. 28B is the graph of response time corresponding to the graph of IOPS in FIG. 28A.

The graph of FIG. 28B conceptually shows the response time of a source pool calculated in the performance check during data evacuation (S2304) and the performance check after data evacuation (S2305) in the creating a resource migration plan (S2004) described with reference to FIG. 23. This graph shows the response times in both of the cases where an inter-tier rearrangement immediately after data evacuation is performed and is not performed.

In FIG. 28A, the solid line 2801 denotes the IOPS average of a source pool; the dashed line 2802 denotes the estimated IOPS in the case where resource migration (data evacuation) is started at the time T81; and the dashed-dotted line 2803 denotes the estimated IOPS in the case where resource migration is started at the time T82.

In FIG. 28B, the solid line 2804 denotes the average response time of the source pool; the dashed line 2805 denotes the estimated response time in the case where resource migration is started at the time T81; the dashed-dotted line 2806 denotes the estimated response time in the case where resource migration is started at the time T82; and the dashed-two-dotted line 2807 denotes the upper limit of the response time specified by SLOs.

The graph of FIG. 28B indicates that an SLO violation occurs to a source pool because of the load caused by resource deallocation in the case where resource migration is started at the time T81 but no SLO violation occurs in the case where the resource migration is started at the time T82. The performance manager 502 adds the resource migration plan that does not commit an SLO violation to the proposed resource migration plan table 515.

Now, with reference to the flowchart of FIG. 25, an example of the performance check during data evacuation (S2304) will be described. In the performance check during data evacuation, the performance manager 502 estimates additional IOPS caused by page migration based on the transfer rates between tiers and the modeled correlation between IOPS and response time in each tier.

Moreover, the performance manager 502 estimates the increment in IOPS in each tier during page evacuation in consideration of this estimated additional IOPS and predicted variation in page arrangement in the pool during data evacuation accompanied by resource deallocation. Using the estimated increment in IOPS in each tier, the performance manager 502 estimates the performance of each tier during data evacuation.

The performance manager 502 estimates the performance of the source pool during data evacuation using the page arrangement in the pool and data transfer rate information between tiers. The performance manager 502 predicts whether an SLO violation will occur to the source pool during data evacuation using the estimated performance.

Figure 25:
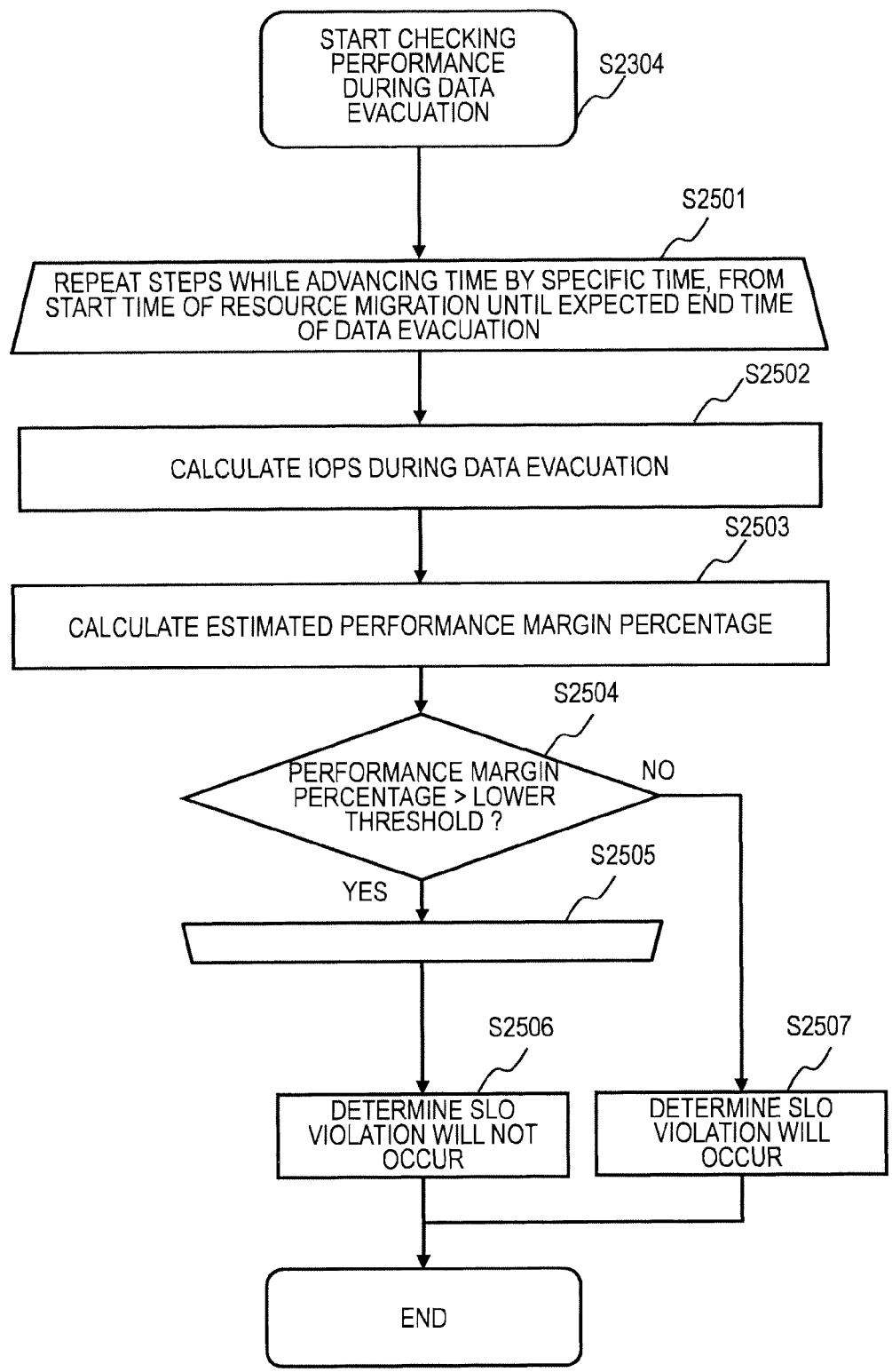
FIG. 25 is a flowchart illustrating an example of performance check during data evacuation in this embodiment.

As illustrated in FIG. 25, the performance manager 502 repeats the steps between S2501 and S2505 while advancing the time from the start time of resource migration (start time of data evacuation) until the expected completion time of data evacuation by a predetermined time. In other words, the performance manager 502 predicts whether an SLO violation will occur at each selected time between the start of data evacuation and the end of the data evacuation. The predetermined time may be ten minutes, for example, but the time intervals do not need to be constant. The same applies to the flowchart of FIG. 26.

At S2502, the performance manager 502 calculates IOPS during data evacuation. Specifically, the performance manager 502 first refers to the timeslot-averaged IOPS information table 519 and obtains the timeslot-averaged IOPS of the pool in the relevant timeslot. Next, the performance manager 502 predicts the page arrangement of the source pool at the time (the timeslot) during the data evacuation.

In predicting the page arrangement, it is assumed that, in a data evacuation, pages migrates to free areas in the pool one by one in the descending order of the I/O count in the previous monitoring period as described with reference to FIG. 17. As previously described, the method of page migration may be different as far as rules therefor are predetermined.

Moreover, the performance manager 502 obtains data transfer rates between tiers. The method is the same as the one that obtains the transfer rates in individual transfer paths in the creating a resource migration plan (S2004) described with reference to FIG. 23. The performance manager 502 can predict the page arrangement at the time from the rules for the page migration method and the data transfer rates between tiers.

Next, the performance manager 502 calculates an average transfer rate in the pool (average transfer rate in data relocation in the pool) while applying the amount of data to be transferred in the data evacuation and the estimated time required for resource deallocation (already obtained at S2303 in the creating a resource migration plan in FIG. 23) to the following formula:

Average transfer rate in a pool=the amount of data to be transferred/the estimated time required for resource deallocation The performance manager 502 calculates (estimates) an additional IOPS caused by the data evacuation (the value corresponding to the additional IOPS) while applying the transfer rate (MB/s) and the amount of data which can be processed per I/O (MB per I/O) to the following formula:

Additional IOPS caused by a data evacuation=average transfer rate of the pool/the amount of data which can be processed per I/O The performance manager 502 calculates the I/O percentage of each tier in the pool. The calculation method is the same as that in the updating the IOPS vs. response time correlation information table (S603) described with reference to FIG. 14. That is to say, the performance manager 502 calculates the IOPS of each tier in the pool from the average IOPS of the pool obtained from the timeslot-averaged IOPS information table 519 based on the I/O percentage of each tier in the pool. The value obtained by multiplying the average IOPS of the pool by the I/O percentage of the tier is the IOPS of the tier.

The performance manager 502 adds the additional IOPS obtained as above to the IOPS of the source tier and the destination tier of the data evacuation. Through this calculation, estimated IOPS in each tier in the pool are obtained.

Next, at S2503, the performance manager 502 calculates an estimated performance margin percentage. Specifically, the performance manager 502 searches the IOPS vs. response time correlation information table 521 with a key of IOPS in each tier during the data evacuation obtained at S2502 and the kind of tier to obtain the estimated response time of each tier from the column of IOPS range-averaged response times 1603.

Moreover, the performance manager 502 calculates the total I/O counts of all pages in the individual tiers in the pool from the column of I/O count in the previous monitoring period 1106 in the page information table 514. These values are the total I/O counts of the individual tiers.

The performance manager 502 applies these values to the following formula to calculate an estimated response time of the pool. This is a weighted average of response time by the I/O count.

Estimated response time of a pool=($\Sigma$(total I/O count in each tier×estimated response time in each tier))/total I/O count in the pool The performance manager 502 calculates an estimated performance margin percentage of the pool based on the obtained estimate response time of the pool. The performance margin percentage of the pool obtained in the planning to solve the performance problem illustrated in FIG. 20 is calculated based on the daily average response time of the pool. The estimated performance margin percentage of the pool is calculated as follows, based on the estimated response time of the pool. The upper limit of the requested response time is determined in accordance with the same criteria as the daily average response time of the pool.

Estimated performance margin percentage (%)=100−
(estimated response time of a pool/the upper
limit of the requested response time)×100

Next, at S2504, the performance manager 502 compares the obtained estimated performance margin percentage with the lower threshold predetermined by the administrator. If the estimated performance margin percentage is equal to or less than the lower threshold (NO at S2504), the performance manager 502 determines that an SLO violation occurs (S2507) and terminates the processing. If the estimated performance margin percentage is more than the lower threshold (YES at S2504), the performance manager 502 proceeds to S2505. If it is expected that the estimated performance margin percentage keeps the level higher than the lower threshold until the expected completion time of data evacuation, the performance manager 502 determines that no SLO violation occurs (S2506) and terminates the processing.

Figure 26:
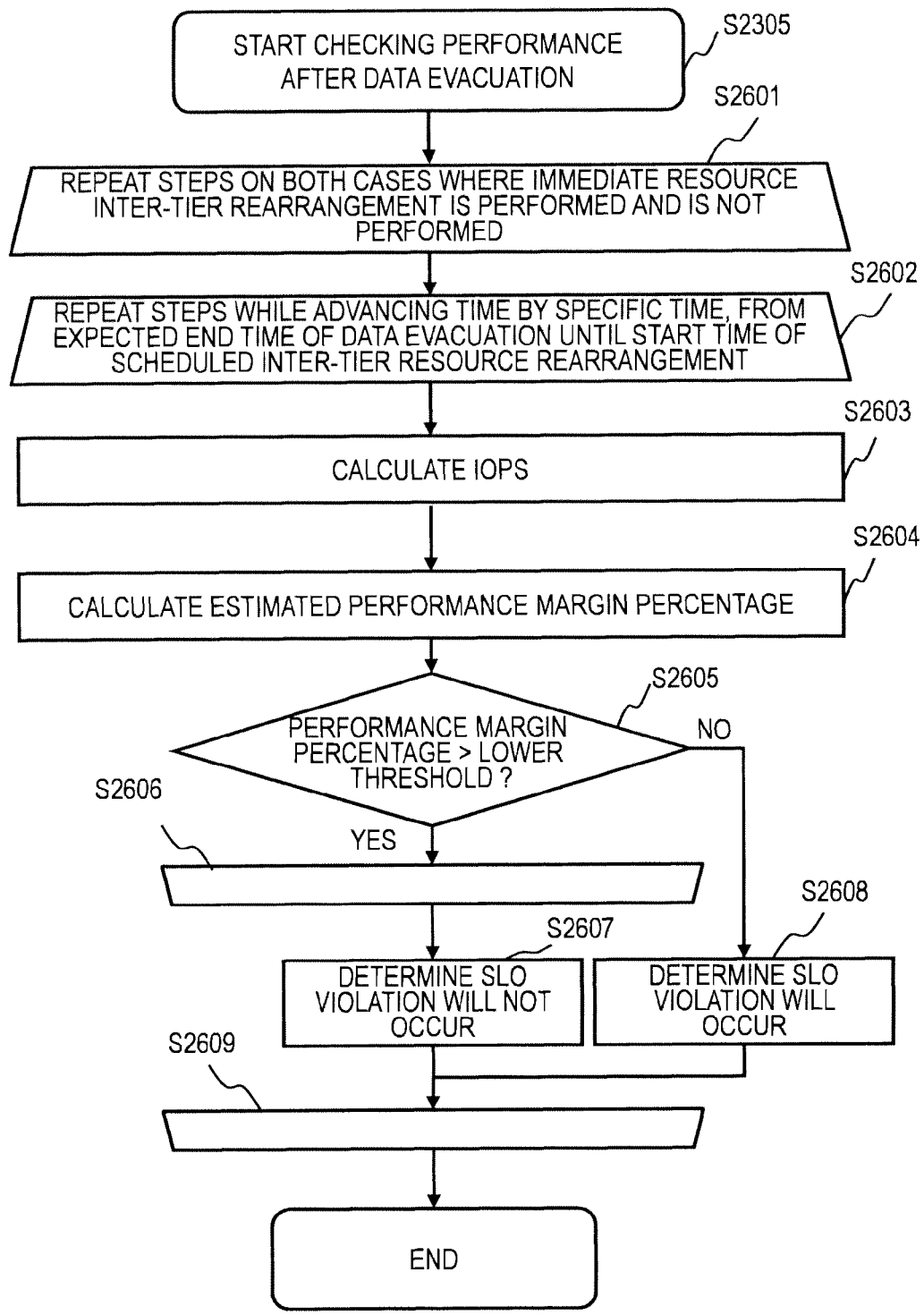
FIG. 26 is a flowchart illustrating an example of performance check after data evacuation in this embodiment.

Now, with reference to the flowchart of FIG. 26, an example of the performance check after data evacuation (S2305) is described. In this example, the performance manager 502 predicts the performance of the source pool and the occurrence of an SLO violation for the two cases where an inter-tier rearrangement is carried out immediately after the completion of data evacuation and is not carried out immediately after the completion of data evacuation but is postponed until the next scheduled periodic inter-tier rearrangement.

As described with reference to FIG. 23, the performance manager 502 can predict a page arrangement at each selected time and estimate the IOPS and the response time in the page arrangement. Moreover, for estimating additional IOPS in inter-tier rearrangement, the same method of estimating additional IOPS in data evacuation described with reference to FIG. 23 can be used.

In the flowchart of FIG. 26, the performance manager 502 repeats the steps between S2601 and S2609 for the both cases with and without immediate inter-tier rearrangement after data evacuation. That is to say, the performance manager 502 estimates the performance of the source pool for the both cases where an immediate inter-tier rearrangement is performed and is not performed.

The performance manager 502 repeats the steps between S2602 and S2606 while advancing the time by a specific time from the expected completion time of data evacuation to the start time of the next periodic inter-tier rearrangement. Namely, the performance manager 502 predicts the performance and whether an SLO violation occurs at each selected time between the end of data evacuation and the start of the next periodic inter-tier rearrangement.

In the case where a periodic inter-tier rearrangement is not scheduled (in the case where the execution mode in the pool information table 511 is "manual") on the source pool whose performance is to be estimated, the performance manager 502 estimates the performance and checks whether an SLO violation occurs for the period from the end of data evacuation to 24 hours thereafter.

At S2603, the performance manager 502 calculates IOPS at the particular time. The methods of calculating IOPS are different between the cases where an immediate inter-tier rearrangement is performed and is not performed. In the case where the immediate inter-tier rearrangement is not performed, the performance manager 502 calculates the IOPS of each tier in the page arrangement at the end of the data evacuation. The calculation method is the same as the one in the performance check during data evacuation illustrated in FIG. 23.

In the case where the immediate inter-tier rearrangement is performed, the performance manager 502 calculates additional IOPS in the source tier and the destination tier of page relocation during the inter-tier rearrangement. Moreover, the performance manager 502 calculates the IOPS in each tier at the time from the page arrangement at the time and the calculated additional IOPS. The calculation method is the same as the one in the performance check during data evacuation illustrated in FIG. 23.

It is unnecessary to calculate IOPS in the period from the end of the immediate inter-tier rearrangement to the start of the next periodic inter-tier rearrangement, but if it is calculated, the performance manager 502 calculates the IOPS of each tier at the time from the page arrangement at the end of the immediate inter-tier rearrangement. The calculation method is the same as the one in the case where the immediate inter-tier rearrangement is not performed. The page arrangement after the immediate inter-tier rearrangement is different from the one in the case where the immediate inter-tier rearrangement is not performed after the completion of the page evacuation.

Next, at S2604, the performance manager 502 calculates an estimated performance margin percentage. This calculation method is the same as the one in the S2503 in the flowchart of performance check during data evacuation in FIG. 25.

At S2605, the performance manager 502 compares the obtained estimated performance margin percentage with the lower threshold predetermined by the administrator. If the estimated performance margin percentage is equal to or less than the lower threshold (NO at S2605), the performance manager 502 determines that an SLO violation occurs (S2608) and proceeds to S2609. If the estimated performance margin percentage is more than the lower threshold (YES at S2605), the performance manager 502 determines that an SLO violation does not occur (S2607) and proceeds to S2609.

The above example explained with reference to FIG. 26 does not predict performance of the pool and the occurrence of an SLO violation between periodic inter-tier rearrangement, but the performance manager 502 may predict them in the period.

As described above, this embodiment enables the overall storage system to ensure the performance level required by hosts provided with volumes while keeping the TCO low. Furthermore, it achieves significant reduction in the load to the administrator for the purpose. Determining a source pool which has less possibility of SLO violation and is available for earlier resource deallocation therefrom reduces the probability of occurrence of an SLO violation.

As set forth above, this invention has been described in detail with reference to the accompanying drawings; however, this invention is not limited to the specific configurations but includes various modifications and equivalent configurations within the scope of the appended claims. At least a part of the programs may be implemented by dedicated hardware. The programs can be installed to a computer through a program distribution server or a computer-readable non-transitory storage medium, and can be stored in a non-volatile storage device in the computer.

At least a part of the setting by the administrator via the input and output device in this embodiment may be performed by a program. In the above-described configuration, the migration resource from a pool to pool is one or more pool volumes in a migration source but the migration resource from a pool to pool may be a part of the real storage areas of a pool volume of a migration source.

The management system may use a value different from the response time as an index of the performance requirements to be satisfied by pools. For example, transfer rate (MB/s), throughput (Max-TOPS), or any other index may be used.

As described above, to achieve earlier resource migration, it is preferable that the management system perform performance estimation for both of the cases where an immediate inter-tier rearrangement is performed after data evacuation and is not performed; however, it may perform the performance estimation for either case only.

The above configuration example performs an inter-tier rearrangement immediately after data evacuation in the pool for providing a resource. Unlike this, the management system may perform an inter-tier rearrangement before a periodic inter-tier rearrangement at a given time after the completion of the data evacuation. The management system can perform independent simulations while separating the data evacuation and the inter-tier rearrangement.

The management system first carries out performance estimation (simulation) during data evacuation, and then carries out performance estimation (simulation) during an inter-tier rearrangement and thereafter while advancing the start time of the inter-tier rearrangement from the completion time of the data evacuation by a predetermined time. This sequence increases the possibility to obtain a resource migration plan which will not commit an SLO violation and provides an earlier completion time of data evacuation.

As described above, it is preferable that the management system perform simulation for performance estimation based on the history information of the storage system periodically obtained. This configuration enables more accurate performance estimation. Depending on the design, it may perform the performance estimation using predetermined specific data.

The management system does not need to carry out performance estimation by simulation in a period where no data relocation is performed in a pool. For example, the management system estimates the performance during data evacuation and in the period of immediate inter-tier rearrangement, if it is performed, and predicts whether an SLO violation occurs using the estimated performance.

The above configuration example determines a risky pool and selects a source pool using performance margin percentage, but may do the same using a different index. As described above, it is preferable to select the migration plan which provides the earliest expected time to add a resource to a risky pool, but depending on the design, it may select a migration plan by different criteria. For example, it may use the performance margin percentage after resource migration of a source pool as the criterion with the highest priority.

As described above, it is efficient to carry out performance estimation by detailed simulation on the pools which are expected to satisfy the SLOs after an inter-tier rearrangement is performed, but detailed simulation after the start of data evacuation may be performed on every pool.

What is claimed is:

1. A computer system comprising:
a storage system; and
a management system coupled to the storage system via a network and configured to manage the storage system,
wherein the storage system includes a plurality of pools each of which includes a plurality of storage resources and is separated into a plurality of tiers different in access performance;
wherein the management system monitors access performance of the plurality of pools to detect a risky pool which is expected to become unable to satisfy predetermined access performance requirements;
wherein the management system estimates access performance of each of one or more candidate pools in the plurality of pools in a case where a storage resource thereof migrates to the risky pool, by simulation based on variations in data arrangement in the pool caused by evacuating data held in the storage resource in the same pool for the migration of the storage resource; and
wherein the management system determines that the storage resource migrates from a source pool of which the estimated access performance satisfies predetermined performance requirements to the risky pool.

2. A computer system according to claim 1, wherein the management system estimates the access performance of each of the one or more candidate pools during a period of the data evacuation using a predicted data arrangement varied by data relocation for the storage resource to migrate and estimated additional load caused by the data relocation for the storage resource to migrate.

3. A computer system according to claim 2,
wherein, in the estimation of the time variation of the access performance by simulation, the management system estimates the access performance of each of the one or more candidate pools in a period in which data relocation does not occur in the candidate pool using predicted data arrangement in the candidate pool; and
wherein, in the estimation of the time variation of the access performance by simulation, the management system estimates the access performance of each of the one or more candidate pools in a period in which data relocation occurs in the candidate pool using estimated additional load caused by the data relocation in the candidate pool in addition to predicted data arrangement in the candidate pool.

4. A computer system according to claim 3, wherein the management system repeats the estimation of the access performance of each of the one or more candidate pools while advancing the start time of the data evacuation to find a start time of data evacuation with which the estimated access performance satisfies the predetermined performance requirements of the candidate pool.

5. A computer system according to claim 4, wherein the management system selects a candidate pool in which an expected completion time of the data evacuation is the earliest as the source pool from the one or more candidate pools in which the estimated access performance satisfies the predetermined performance requirements.

6. A computer system according to claim 5,
wherein the management system holds history information on accesses to each of the one or more candidate pools collected from the storage system and information on access performance of individual tiers in each of the one or more candidate pools; and
wherein the management system estimates the access performance of each of the one or more candidate pools using the access history information and the information on access performance in periods during the data evacuation and after the completion of the data evacuation.

7. A computer system according to claim 6, wherein, in a case where the simulation includes an inter-tier rearrangement after the completion of evacuating the data in the storage resource, the management system estimates access performance of each of the one or more candidate pools during the inter-tier rearrangement after the completion of the data evacuation using predicted data arrangement changed by a tier-to-tier data relocation in the candidate pool and estimated additional load caused by the tier-to-tier data relocation.

8. A computer system according to claim 7, wherein the management system estimates access performance of each of the one or more candidate pools in both of a case where the inter-tier rearrangement is carried out immediately after evacuating the data in the storage resource and a case where the inter-tier rearrangement is not carried out immediately after evacuating the data in the storage resource.

9. A computer system according to claim 8,
wherein the management system monitors accesses to the source pool while the storage resource is migrating from the source pool to the risky pool; and
wherein the management system determines whether to abort the migration of the resource based on the monitored accesses to the source pool and the estimated access performance of the source pool.

10. A method of managing a storage system in a computer system, the computer system including the storage system which includes a plurality of storage resources and a plurality of pools separated into a plurality of tiers different in access performance and a management system connected to the storage system via a network to manage the storage system, the method comprising:
monitoring, by the management system, access performance of the plurality of pools to detect a risky pool which is expected to become unable to satisfy predetermined access performance requirements;
estimating, by the management system, access performance of each of one or more candidate pools in the plurality of pools in a case where a storage resource migrates to the risky pool, by simulation based on variations in data arrangement in the candidate pool caused by evacuating data held in the storage resource in the same pool for the migration of the storage resource; and
determining, by the management system, that the storage resource migrates from a source pool of which the estimated access performance satisfies predetermined performance requirements to the risky pool.

11. A method of managing a storage system according to claim 10, further comprising:
estimating, by the management system, the access performance of each of the one or more candidate pools during a period of the data evacuation using predicted data arrangement varied by data relocation for the storage resource to migrate and estimated additional load caused by the data relocation for the storage resource to migrate.

12. A method of managing a storage system according to claim 10, further comprising:
repeating, by the management system, the estimating the access performance of each of the one or more candidate pools while advancing the start time of the data evacuation to find a start time of data evacuation with which the estimated access performance satisfies the predetermined performance requirements; and
selecting, by the management system, a candidate pool in which an expected completion time of the data evacuation is the earliest as the source pool from the one or more candidate pools in which the estimated access performance satisfies the predetermined performance requirements.

13. A method of managing a storage system according to claim 10, further comprising:
storing, by the management system, history information on accesses to each of the one or more candidate pools collected from the storage system and information on access performance of individual tiers in each of the one or more candidate pools; and
estimating, by the management system, access performance of each of the one or more candidate pools using the access history information and the information on access performance in periods during the data evacuation and after the completion of the data evacuation.

14. A method of managing a storage system according to claim 10, further comprising:
estimating, by the management system, the access performance of each of the one or more candidate pools during an inter-tier rearrangement after the completion of the data evacuation using predicted data arrangement changed by a tier-to-tier data relocation in the candidate pool and estimated additional load caused by the tier-to-tier data relocation in a case where the simulation includes the inter-tier rearrangement after the completion of evacuating the data in the storage resource.

15. A method of managing a storage system according to claim 14, further comprising:
estimating, by the management system, access performance of each of the one or more candidate pools in both of a case where the inter-tier rearrangement is carried out immediately after evacuating the data in the storage resource and a case where the inter-tier rearrangement is not carried out immediately after evacuating the data in the storage resource.

* * * * *